(12) United States Patent
Christianson et al.

(10) Patent No.: US 10,365,365 B2
(45) Date of Patent: Jul. 30, 2019

(54) ENHANCED WEATHER RADAR MAPPING

(71) Applicant: Honeywell International Inc., Morris Plains, NJ (US)

(72) Inventors: Paul E. Christianson, Seattle, WA (US); Gloria Logan, Woodinville, WA (US)

(73) Assignee: Honeywell International Inc., Morris Plains, NJ (US)

( * ) Notice: Subject to any disclaimer, the term of this patent is extended or adjusted under 35 U.S.C. 154(b) by 315 days.

(21) Appl. No.: 15/365,841

(22) Filed: Nov. 30, 2016

(65) Prior Publication Data

US 2018/0149745 A1 May 31, 2018

(51) Int. Cl.
| | |
|---|---|
| *G01S 7/00* | (2006.01) |
| *G01S 7/06* | (2006.01) |
| *G01S 7/41* | (2006.01) |
| *G01S 13/42* | (2006.01) |
| *G01S 13/89* | (2006.01) |
| *G01S 13/95* | (2006.01) |

(52) U.S. Cl.
CPC ............ *G01S 13/953* (2013.01); *G01S 7/003* (2013.01); *G01S 7/062* (2013.01); *G01S 7/064* (2013.01); *G01S 7/411* (2013.01); *G01S 13/42* (2013.01); *G01S 13/89* (2013.01); *Y02A 90/18* (2018.01)

(58) Field of Classification Search
CPC ........ G01S 7/003; G01S 13/95; G01S 13/951; G01S 13/955; G01S 13/953; G01S 13/956; G01S 13/958
See application file for complete search history.

(56) References Cited

U.S. PATENT DOCUMENTS

| 7,307,576 B1 | 12/2007 | Koenigs | |
| 7,307,577 B1 * | 12/2007 | Kronfeld | ................ G01S 7/411 |
| | | | 342/26 B |

(Continued)

FOREIGN PATENT DOCUMENTS

| EP | 3018492 A1 | 5/2016 |
| FR | 2926639 A1 | 7/2009 |
| KR | 101483617 B1 | 1/2015 |

OTHER PUBLICATIONS

"Intuvue RDR-4000 3D Weather Radar Systems," Honeywell Technical White Paper, Sep. 2016, 19 pp.

(Continued)

*Primary Examiner* — Peter M Bythrow
(74) *Attorney, Agent, or Firm* — Shumaker & Sieffert, P.A.

(57) ABSTRACT

This disclosure is directed to techniques, methods, devices, and systems for generating a two-dimensional weather map based on three-dimensional volumetric weather data that incorporates enhanced weather analysis techniques applied to weather radar data. An example method includes generating, by a computing system comprising one or more processors, a two-dimensional weather map based at least in part on three-dimensional volumetric weather data for a volume of airspace, wherein the two-dimensional weather map indicates levels of convection and levels of risk of other hazardous weather applicable to the volume of airspace. The method further includes outputting, by the computing system, the two-dimensional weather map for transmission to a receiving system.

20 Claims, 9 Drawing Sheets

(56) References Cited

U.S. PATENT DOCUMENTS

| | | |
|---|---|---|
| 7,417,579 B1 | 8/2008 | Woodell |
| 7,486,220 B1 * | 2/2009 | Kronfeld ............... G01S 13/953 |
| | | 342/26 B |
| 7,492,304 B1 | 2/2009 | Woodell et al. |
| 7,515,088 B1 | 4/2009 | Woodell et al. |
| 7,541,971 B1 | 6/2009 | Woodell et al. |
| 8,068,050 B2 | 11/2011 | Christianson |
| 8,111,186 B2 | 2/2012 | Bunch et al. |
| 8,159,369 B1 * | 4/2012 | Koenigs ................. G01S 7/062 |
| | | 340/963 |
| 8,212,712 B2 | 7/2012 | Bon et al. |
| 8,223,062 B2 * | 7/2012 | Bunch ............... H04B 7/18506 |
| | | 342/26 B |
| 8,228,227 B2 | 7/2012 | Bunch et al. |
| 8,395,541 B2 * | 3/2013 | Khatwa ..................... G01S 7/22 |
| | | 342/26 B |
| 8,502,727 B2 * | 8/2013 | Pujol ....................... G01S 7/411 |
| | | 342/26 B |
| 8,742,974 B1 * | 6/2014 | Sishtla .................. G01S 13/953 |
| | | 342/182 |
| 8,847,794 B2 * | 9/2014 | Buratto ............... G08G 5/0091 |
| | | 340/971 |
| 8,994,578 B1 * | 3/2015 | Finley ................... G01S 13/953 |
| | | 342/26 B |
| 9,000,972 B1 * | 4/2015 | Cahoon .................. G01S 13/95 |
| | | 342/26 B |
| 9,019,146 B1 * | 4/2015 | Finley ..................... G01S 13/95 |
| | | 342/26 B |
| 9,057,773 B1 * | 6/2015 | Fersdahl ............... G01S 13/953 |
| 9,223,020 B1 * | 12/2015 | Crosmer ............... G01S 13/951 |
| 9,244,157 B1 * | 1/2016 | Sishtla ................... G01S 7/062 |
| 9,244,167 B1 * | 1/2016 | Oransky ............... G01S 13/953 |
| 9,384,586 B1 * | 7/2016 | McCusker ........... G08G 5/0021 |
| 9,395,438 B1 * | 7/2016 | Woodell .................... G01S 7/04 |
| 9,411,044 B1 * | 8/2016 | Sperling ................... G01S 7/22 |
| 9,710,218 B2 * | 7/2017 | Khatwa .................. G06F 3/147 |
| 9,810,770 B1 * | 11/2017 | Weichbrod ........... G01S 13/953 |
| 9,823,347 B1 * | 11/2017 | Koenigs ............... G01S 13/953 |
| 9,864,055 B1 * | 1/2018 | Sishtla ................. G01S 13/953 |
| 9,869,766 B1 * | 1/2018 | Breiholz ................. G01S 13/95 |
| 10,037,124 B2 * | 7/2018 | Khatwa ............... G06F 3/04817 |
| 2009/0219196 A1 * | 9/2009 | Bunch ..................... G01S 7/003 |
| | | 342/176 |
| 2010/0164786 A1 | 7/2010 | Costes et al. |
| 2010/0245167 A1 * | 9/2010 | Bunch ..................... G01S 7/003 |
| | | 342/26 B |
| 2010/0302093 A1 * | 12/2010 | Bunch ............... H04B 7/18506 |
| | | 342/26 B |
| 2011/0074624 A1 * | 3/2011 | Bunch ..................... G01S 7/003 |
| | | 342/26 D |
| 2013/0328715 A1 | 12/2013 | Dinkins et al. |
| 2017/0082745 A1 * | 3/2017 | Kronfeld ............... G01S 13/953 |

OTHER PUBLICATIONS

"WXR-2100 MultiScan ThreatTrack weather radar," Rockwell Collins, Mar. 2014, 2 pp.

Schilke et al., "Dynamic Route Optimization Based on Adverse Weather Data," Fourth SESAR Innovation Days, Nov. 25-27, 2014, 8 pp.

Response to Communication pursuant to Rules 70(2) and 70a(2) dated Jun. 11, 2018, from counterpart European Patent Application 17201754.3, filed on Aug. 28, 2018, 21 pp.

European Search Report from counterpart European Application No. 17201754.3, dated Mar. 16, 2018, 8 pp.

* cited by examiner

ENHANCED WEATHER RADAR MAPPING

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. An aircraft in flight may also receive weather information from ground stations. Up-to-date weather information may assist the flight crew in evaluating whether or how to modify a flight plan to avoid hazards for the flight. Airborne weather radar detects reflectivity of weather associated with precipitation. Reflectivity of a radar signal is an electrical quantity related to the percentage of power (normalized for range) returned from the weather being illuminated by the radar transmission. Reflectivity is generally related to rate of precipitation.

SUMMARY

This disclosure is directed to systems, devices, methods, and techniques for enabling or operating a weather radar processing system that may provide a weather radar output in the form of a two-dimensional weather map enhanced with additional techniques or data sources beyond the conventional weather radar. Examples of a two-dimensional weather map of this disclosure may accurately depict weather hazards that are obscurely represented in conventional weather radar data and suppress spurious hazard indications from the conventional weather radar data. The system may communicate this two-dimensional weather map to an external weather data aggregating system that may then relay the two-dimensional weather map, potentially in combination with other two-dimensional weather maps from other aircraft and/or other sources of weather data, to other aircraft or recipients, such as that may be in the vicinity of the weather radar scan represented by the two-dimensional weather map. Weather radar processing systems, devices, methods, and techniques of this disclosure may help pilots and flight crews more accurately route flights of their aircraft away from hazardous weather, thereby promoting fuel efficiency, hazard avoidance, and shorter flights, and transmission in the form of a two-dimensional weather map may ensure simplified and uniform graphical display requirements and low bandwidth requirements.

In one example, a method includes generating, by a computing system comprising one or more processors, a two-dimensional weather map based at least in part on three-dimensional volumetric weather data for a volume of airspace, wherein the two-dimensional weather map indicates levels of convection and levels of risk of other hazardous weather applicable to the volume of airspace. The method further includes outputting, by the computing system, the two-dimensional weather map for transmission to a receiving system.

Another example is directed to a device comprising a computer-readable medium having program code stored thereon, the device configured for the program code to be executable by one or more processors for causing the one or more processors to generate a two-dimensional weather map based at least in part on three-dimensional volumetric weather data for a volume of airspace, wherein the two-dimensional weather map indicates levels of convection and levels of risk of other hazardous weather applicable to the volume of airspace. The device is further configured for the program code to be executable by one or more processors for causing the one or more processors to output the two-dimensional weather map for transmission to a receiving system.

Another example is directed to a system comprising one or more memory devices and one or more processors operably coupled to the one or more memory devices. The one or more processors are configured to generate a two-dimensional weather map based at least in part on three-dimensional volumetric weather data for a volume of airspace, wherein the two-dimensional weather map indicates levels of convection and levels of risk of other hazardous weather applicable to the volume of airspace. The one or more processors are further configured to output the two-dimensional weather map for transmission to a receiving system.

The details of one or more examples are set forth in the accompanying drawings and the description below. Other features, objects, and advantages will be apparent from the description and drawings, and from the claims.

DETAILED DESCRIPTION

Figure 1:
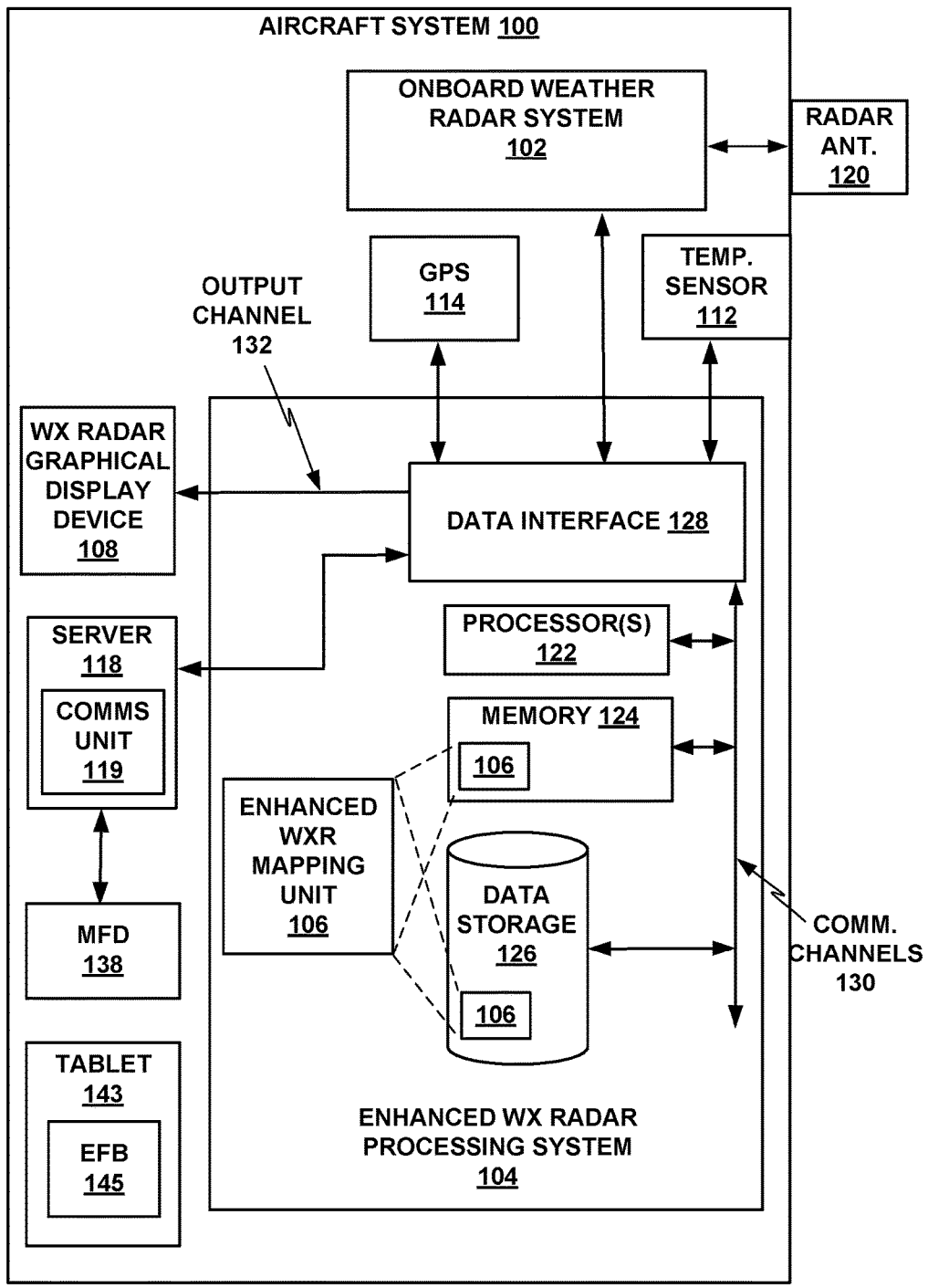
FIG. 1 depicts a conceptual block diagram of an example aircraft system that includes an enhanced weather radar processing system that performs enhanced weather radar mapping, in accordance with example aspects of this disclosure.

This disclosure is directed to systems, devices, and methods for enabling or operating an enhanced weather radar processing system that may perform sophisticated processing of weather radar data and supplemental weather data to provide an enhanced weather radar output in the form of a two-dimensional weather map that provides a simplified view of potential weather hazards, such as are relevant to evaluating the route of an aircraft in flight. The two-dimensional weather map is based at least in part on three-dimensional weather radar data that incorporates additional data and analysis to correct for non-correlations between radar reflectivity and convection, and to show additional hazards such as lightning and hail. The two-dimensional weather map may use supplemental data and analysis to accurately depict weather hazards that may be obscured or missing in a conventional weather radar display, while also suppressing spurious hazard indications from the conventional weather radar data. The enhanced weather radar processing system may communicate such an enhanced two-dimensional weather map to an external enhanced weather data aggregator, such as a centralized weather data service provider. The centralized weather data service provider may combine the enhanced weather radar data from one or more enhanced weather radar processing systems on one or more aircraft, and potentially with additional weather data from other weather radar or non-radar weather data sources, and communicate combined enhanced weather radar map outputs to other aircraft, vehicles, or interested recipients.

The basis of weather radar data is the reflectivity of different parts of the sky, which is generally indicative of levels of precipitation, typically a proxy for weather hazards such as convection, lightning, and hail. Generally, reflectivity of an area of sky may correlate with precipitation, which may in turn be an indicator of convection. High convection may pose a hazard to an aircraft in flight, and may also correlate with lightning and/or hail. However, high reflectivity may also occur without convection, principally due to a meteorological mechanism known as bright band effect, which occurs due to a thin transition layer in the atmosphere where snow melts into raindrops and exhibits exaggerated reflectivity due to the structure of the partially melted hydrometeors (snowflakes in the process of melting into raindrops). Thus, in a bright band effect, the nominal relationship between reflectivity and rate of precipitation breaks down, and a traditional weather radar may show a greater rate of precipitation than is actually present. An implementation of this disclosure may correct for false positive hazard indications from a conventional weather radar output by suppressing bright band.

An implementation of this disclosure may also distinguish the relative severity of hazard indications, and correct for negative hazard indications, from a conventional weather radar output by incorporating secondary techniques for detecting hazardous conditions such as lightning and hail, and for indicating when radar data is attenuated or missing. For example, an implementation of this disclosure may incorporate temperature data and perform modeling of atmospheric conditions based on both the weather radar data and the temperature data to detect and characterize potential for lightning and hail. An implementation of this disclosure may further correct for false negative hazard indications from a conventional weather radar output by detecting and indicating when data for a given area is falsely attenuated or is missing due to attenuation by intervening weather or failure to have been updated in one or more most recent weather radar scans. A conventional weather radar display may show areas of attenuated or missing data with the same graphical indication (e.g., black color) as if those areas had little or no return of radar signal and therefore as if they had low reflectivity and calm weather. An enhanced weather radar system of this disclosure may detect areas of attenuated or missing data and depict those areas differently to distinguish them from areas of low reflectivity.

Bright band effect may be caused when weather conditions cause a stratiform precipitation structure to intersect a freezing point altitude, and precipitation that begins as snow falling from above the freezing point altitude falls through the freezing point altitude and begins melting from the exterior inward. Each snowflake temporarily has a large frozen core but an outer shell of newly molten water, forming a partially melted hydrometeor. Snowflakes are typically much larger and much less reflective than raindrops, but partially melted hydrometeors combine the large size of snowflakes with the high reflectivity of rain, such that they may deceptively appear to weather radars as an exaggerated precipitation rate within a relatively narrow altitude range, also known as bright band. An enhanced weather radar processing system of this disclosure may analyze bright band sources or other high-reflectivity sources within the context of vertical columns of precipitation, and detect and negate the falsely inflated precipitation rates caused by bright band or other high-reflectivity stratiform weather structures. Throughout this description, suppression of bright band may be generalized to suppression of spurious indications of hazardous weather by anomalously high-reflectivity stratiform weather structures, as further described below.

An enhanced weather radar system of this disclosure may characterize lightning and hail risks beyond detecting convection itself by incorporating temperature data together with weather radar data, using a detected temperature exterior to the aircraft, sensed with a temperature sensor separate from the weather radar system, and analyzing the combination of weather radar data and temperature data in the context of well-characterized physical relationships of temperature in the atmosphere. An enhanced weather radar system of this disclosure may model an altitude of a freezing point temperature, or a temperature of an echo top altitude, and compare radar data to the altitude of the freezing point temperature or the temperature of the echo top altitude, to characterize lightning and hail risks, as further described below.

By avoiding falsely exaggerated indications of high precipitation rates relative to conventional weather radar, by using supplemental data and modeling to determine the risk of lightning and hail beyond using weather radar data alone, and by avoiding falsely minimized or missing indications of absence of hazardous weather relative to conventional weather radar, and by communicating enhanced two-dimensional weather radar maps incorporating such enhanced weather data to other aircraft, such as via a weather data aggregating system external to the aircraft (or directly in some examples), an enhanced weather radar processing system of this disclosure may help pilots and flight crews of an ownship and other aircraft better avoid weather hazards to an aircraft in flight while also avoiding unnecessary detours in flight, thereby promoting fuel efficiency, hazard avoidance, and shorter flights.

FIG. 1 depicts a conceptual block diagram of an example aircraft system 100 that includes an enhanced weather radar processing system 104 that performs enhanced weather radar mapping, in accordance with example aspects of this disclosure. Example aircraft system 100 includes an onboard weather radar system 102, enhanced weather radar processing system 104 including an enhanced weather radar mapping unit 106, a weather radar graphical display device 108, an exterior temperature sensor 112, and a GPS unit 114. Enhanced weather radar processing system 104 with enhanced weather radar mapping unit 106 may evaluate weather radar data from onboard weather radar system 102 to determine whether the weather radar signal includes data that indicates the presence of convective weather and/or a bright band effect. Enhanced weather radar processing system 104 with enhanced weather radar mapping unit 106 may also combine an evaluation of temperature data from temperature sensor 112 and altitude data from, e.g., GPS unit 114 with the weather radar data from onboard weather radar system 102 to determine whether the combined data indicates the presence of hazardous weather such as lightning or hail. Enhanced weather radar processing system 104 may also evaluate the data it receives to detect attenuated or absent data (e.g., via attenuation from intervening weather or failure to update data). If enhanced weather radar mapping unit 106 determines that the weather radar signal does include falsely exaggerated or falsely minimized hazard indications, then enhanced weather radar mapping unit 106 may correct for those falsely exaggerated or falsely minimized hazard indications in the weather radar data, and then output the corrected weather data map for communication to an external weather data aggregating system, as further described below.

Aircraft system 100 may also include a secondary or auxiliary graphical display device, such as MFD 138. Aircraft system 100 also includes server 118, which has its own communications unit 119, which may enable or configure server 118 to communicate with an external data service, as further described below. MFD 138 may be connected to data interface 128 of enhanced weather radar processing system 104 via onboard server 118. A pilot or other flight crew of the aircraft may also operate an electronic flight bag (EFB) 145 executing on, e.g., a tablet computer 143, or a tablet computer 143 executing another display application other than an EFB. MFD 138, tablet 143, and/or weather radar graphical display device 108 may receive (e.g., through a datalink connection via server 118, or through an in-flight WiFi connection of tablet computer 143) a two-dimensional weather map from an enhanced weather radar processing system onboard a different aircraft. MFD 138, tablet 143, and/or weather radar graphical display device 108 may be used to display a two-dimensional weather map, as further described below.

Onboard weather radar system 102 is connected to a weather radar antenna 120. Enhanced weather radar processing system 104 includes one or more processor(s) 122, one or more memory devices 124, one or more data storage devices 126, and a data interface 128. Enhanced weather radar processing system 104 also includes communication channels 130 and output channel 132, such that communication channels 130 are configured to convey data between one or more processors 122, one or more memory devices 124, one or more data storage devices 126, and data interface 128, and output channel 132 is configured to communicate outputs from enhanced weather radar processing system 104, such as to weather radar graphical display device 108. Enhanced weather radar mapping unit 106 may be implemented as one or more executable software applications, modules, libraries, or one or more portions thereof, that may be stored on data storage 126 and/or loaded onto memory 124 and executed by one or more processors 122, in some examples. Enhanced weather radar mapping unit 106 may also be implemented at least in part with specialized processing hardware such as one or more graphical processing units (GPUs), one or more field-programmable gate arrays (FPGAs), one or more systems on a chip (SoCs), or other type of processing hardware, potentially in combination with executable software or firmware.

Onboard weather radar system 102 is operatively connected to enhanced weather radar processing system 104, such as through a data channel between onboard weather radar system 102 and data interface 128 of enhanced weather radar processing system 104. Enhanced weather radar processing system 104 is operatively connected to weather radar graphical display device 108, such as through output channel 132, such that enhanced weather radar processing system 104 may generate two-dimensional weather maps and communicate the two-dimensional weather maps to weather radar graphical display device 108.

Enhanced weather radar mapping unit 106 may be implemented in the form of executable instruction program code and/or data stored or encoded in one or more memory devices 124 and/or one or more data storage devices 126 and that may be executed by one or more processors 122. Enhanced weather radar mapping unit 106 may be implemented at least in part as, or include, any combination of hardware or hardware and software. Enhanced weather radar mapping unit 106 may analogously perform suppression of spurious hazard indications for other forms of high-reflectivity stratiform weather, and may incorporate indications of hazardous weather from secondary techniques where the initial weather radar data fails to indicate the severity of a hazard or is missing updated data. Enhanced weather radar mapping unit 106 may be implemented at least in part as, or include, one or more executable applications, application modules, libraries, classes, methods, objects, routines, subroutines, firmware, and/or embedded code, for example. Examples of techniques and methods performed by enhanced weather radar mapping unit 106 are described further below with additional reference to the subsequent figures.

As noted above, airborne weather radar systems detect reflectivity of weather associated with precipitation. Onboard weather radar system 102 may measure reflectivity of a radar signal as an electrical quantity related to the percentage of power, normalized for range, returned from the weather being illuminated with a radar transmission emitted by onboard weather radar system 102. Reflectivity is generally related to rate of rainfall or rate of precipitation, though this relation may be complicated or distorted by effects such as attenuation of radar sensitivity to a more distant weather structure by a closer, intervening body of precipitation, or bright band due partially melted hydrometeors when snow falls through a freezing/melting altitude, as illustrated in FIG. 2 and described in further detail in reference thereto.

Figure 2:
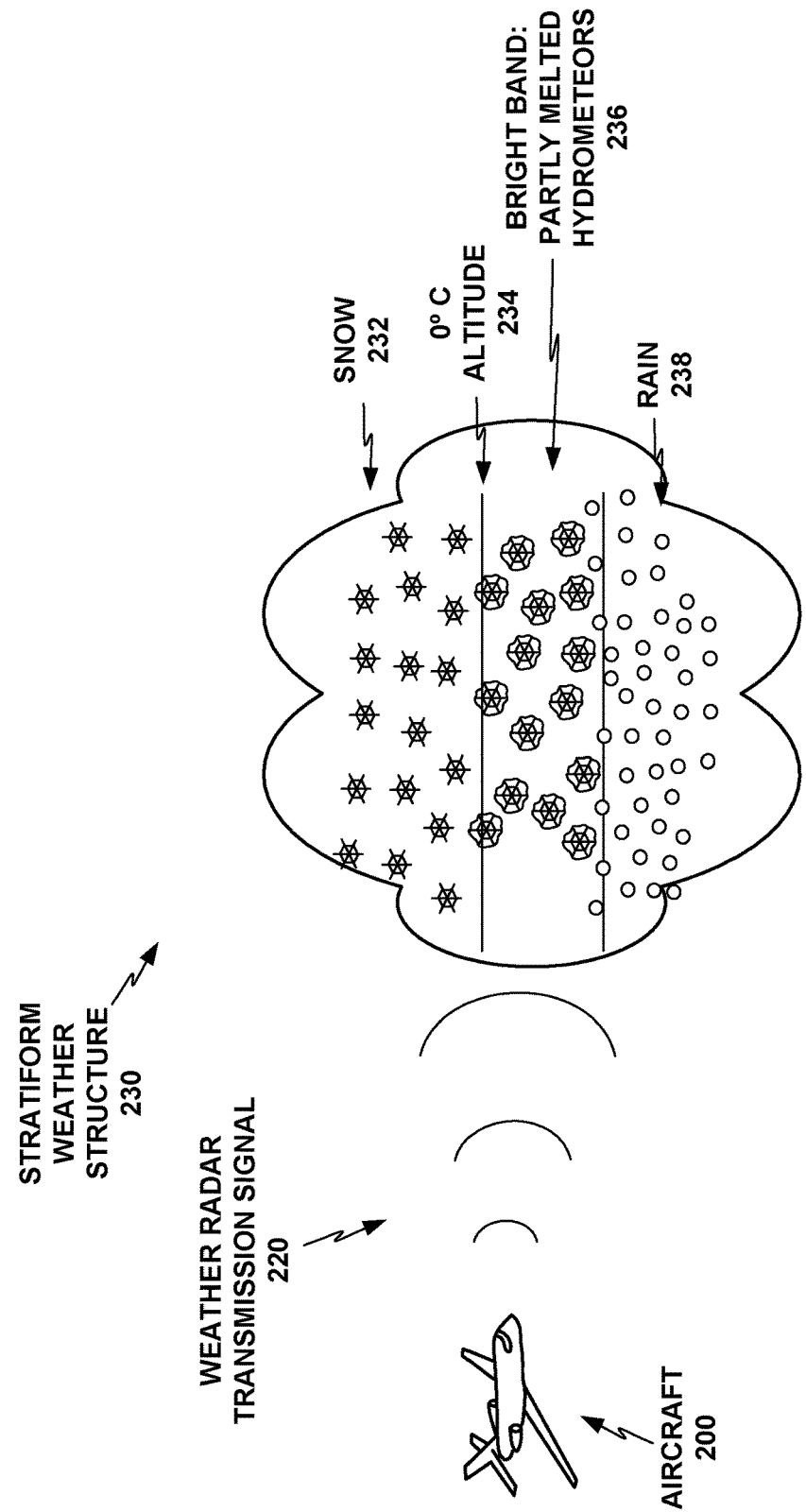
FIG. 2 shows an aircraft approaching a weather structure and emitting a weather radar transmission, in accordance with example aspects of this disclosure.

FIG. 2 shows an aircraft 200 approaching a weather structure 230 and emitting a weather radar transmission 220, in accordance with example aspects of this disclosure. Weather structure 230 includes a snow layer 232 at a high altitude range; a 0 degree (Celsius) altitude 234, at which ambient temperature and pressure conditions change from frozen conditions above to liquid water conditions below; partially melted hydrometeor layer 236 (also referred to as bright band layer 236) at an intermediate altitude range, where the falling snow has begun melting generally from the outside in, and may generally be characterized by low density frozen snowflake structure in the interior and diffusely melted water around the exterior; and a rain layer 238 at a lower altitude range, where the partially melted hydrometeors have fully melted into rain. The partially melted hydrometeor layer 236 is likely to cause a bright band phenomenon in the received signal from weather radar signal 220. The bright band readings from partially melted hydrometeor layer 236 are likely to induce an exaggerated reflectivity relative to the nominal relationship between rate of precipitation and reflectivity, as described above.

The nominal relationship between rate of precipitation and reflectivity may be quantified in terms of, and measured in, decibels (dB) relative to reflectivity (Z), or dBZ. The bright band phenomenon may generally occur in stratiform precipitation, such as in weather structure 230, when part of the weather structure is at or above the 0 degree altitude 234 such that the weather structure contains snow at the higher altitudes, in snow layer 232. Frozen water is typically much less reflective than liquid water (approximately 7 dB given identical shapes and sizes). As the snow falls into the warmer air below 0 degree altitude 234 and begins to melt, causing a temporary state with an outer layer of liquid water forming over a low-density frozen core on the hydrometeor, the reflectivity of each hydrometer rises substantially. Since the volume of frozen forms of hydrometeors is typically higher than the liquid form, the liquid water surface area of the not-quite-completely melted hydrometeor is large compared to its eventual fully melted surface area. Because reflectivity is strongly a function of hydrometeor diameter, this increased size in combination with the high reflectivity of the liquid water causes an exaggeration of the reflectivity, and apparent precipitation rate with respect to the nominal reflectivity-precipitation rate relationship.

The reflectivity within the bright band layer 236 is still further exaggerated by another factor: liquid drops have a higher terminal velocity than ice particles, and thus begin falling much faster as they finish melting and fall out of bright band layer 236. The faster fall-out of liquid drops below bright band layer 236 leads to a lower number density of hydrometeors in rain layer 238 than in bright band layer 236 and thus cause a further exaggeration in reflectivity of bright band layer 236 relative to rain layer 238. As a result, bright band layer 236 shows a reflectivity substantially higher than rain layer 238 or snow layer 232. Bright band layer 236 thus indicates a substantially higher precipitation rate in the nominal dBZ relationship than the actual precipitation rate. A typical aircraft weather radar system may generate a weather radar map display that directly represents the received reflectivity in accordance with the nominal dBZ relationship, and thus indicates precipitation rates substantially greater than the actual precipitation rates when influenced by bright band. In contrast, an enhanced weather radar processing system of this disclosure, such as enhanced weather radar processing system 104 with enhanced weather radar mapping unit 106, may determine whether the weather radar signal includes bright band, and if the weather radar signal does include bright band, generate a weather radar output with the bright band suppressed. In other words, enhanced weather radar processing system 104 with enhanced weather radar mapping unit 106 may generate a weather radar output corrected for the effect of bright band and, as a result, may more accurately indicate the precipitation rates despite the exaggerated reflectivity of the bright band layer 236.

One of the main concerns of an airborne weather radar operator is avoidance of convective weather cells, typically associated with thunderstorms, turbulence, hail, and lightning, all of which are hazards to be avoided. On the other hand, stratiform rainfall usually does not pose hazards beyond loss of visibility. Given that stratiform weather developments can be widespread, it is not operationally realistic to avoid all rainfall. As a result, an aircraft operator seeks to discriminate between stratiform and convective weather to avoid convective hazards, while also avoiding unnecessary deviations around weather. The aircraft operator may typically use several cues to make this distinction including: assessment of the height of a weather structure, either visually or by onboard weather radar; analysis of weather radar display, including contour shape, size and color level of displayed reflectivity; information from external sources (forecasts, air traffic control (ATC), pilot reports (PIREPs)); and general knowledge of weather conditions.

In a typical weather radar display that depicts reflectivity values only, a red level display indication often but does not always correlate with likely hazardous convective weather conditions. Aircraft operators typically tend to use this weather radar information in combination with other information as listed above to make tactical navigation decisions. Generally, if the weather radar display shows rainfall rate at the red level and if other information is ambiguous, an aircraft operator may tend to interpret the weather system as convective rather than stratiform, and accordingly change course to travel around the weather structure. In cases with a traditional weather radar system in which the red level display is due to bright band effect, such course change would be unnecessary and would lead to needless lengthening of the trip and increase in fuel usage; such drawbacks may be avoided with use of an enhanced weather radar processing system 104 with enhanced weather radar mapping unit 106 of this disclosure.

Enhanced weather radar mapping unit 106 may generally follow the nominal relationship between radar reflectivity data and precipitation rates in graphically rendering areas of a weather radar map with different graphical indicators (e.g., colors, patterns) representing each of a number of reflectivity ranges. Enhanced weather radar mapping unit 106 may also render portions of a weather radar map based on both radar reflectivity data and supplemental data, either to suppress spurious indications of hazard from the radar reflectivity data alone (e.g., bright band) or to indicate greater hazard than is apparent from the radar reflectivity data alone (e.g., potential for lightning and/or hail determined from both radar reflectivity data in combination with supplemental data). In one typical graphical representation scheme, enhanced weather radar mapping unit 106 may graphically render map areas with the lowest range of reflectivity, representing the lowest range of rate of precipitation (little or none) in black, and increasing levels of reflectivity, representing increasing ranges of rate of precipitation or rate of rainfall, may generally be graphically represented with, e.g., yellow and orange, respectively. Enhanced weather radar mapping unit 106 may further graphically render map areas with combined information from both the radar reflectivity data and supplemental data with additional colors, e.g., green for bright band, red for lightning potential, and magenta for hail potential. Enhanced weather radar mapping unit 106 may also, or instead, indicate areas of lightning potential or hail potential with icons instead of or in addition to distinctive colors, e.g., an icon depicting a lightning bolt and an icon depicting a ball of hail, respectively.

This example enhanced weather radar map graphical representation scheme is summarized below in Table 1. In this example, enhanced weather radar processing system 104 may depict each area of a weather radar map display with different graphical indicators (e.g., colors, patterns, icons) to represent one of five states: low reflectivity, high reflectivity but stratiform, convective but no risk of lightning or hail, risk of lightning, or risk of hail. The supplemental criteria may be based on vertically integrated reflectivity (VIR) of a vertical column of a weather structure, in order to determine whether or not the vertical column indicates convection or stratiform weather, and by comparing reflectivity data with temperature data, as further described below. Enhanced weather radar processing system 104 may control onboard weather radar system 102 to perform repeated scans of a volume of airspace, correlate radar scan return signals with three-dimensional positions within the volume of airspace, and thereby build up three-dimensional volumetric weather radar data that corresponds to the three-dimensional volume of airspace, and that may be analyzed in terms of data that correspond to vertical columns within the volume of airspace, including determining the VIR of a particular vertical column. Enhanced weather radar processing system 104 may then generate a two-dimensional weather map that may represent the weather conditions of each vertical column in the airspace as a position on the two-dimensional weather map.

TABLE 1

Hazard levels vs. radar reflectivity and supplemental criteria

| Displayed color/icon | Max dBZ in column | Supplemental Criteria | Status |
|---|---|---|---|
| Black | <20 dBZ | | Low reflectivity; little or no convection |
| Green | >=20 dBZ | VIR threshold is not exceeded | Moderate or high reflectivity but stratiform |
| Yellow | >20 dBZ < 40 | VIR threshold exceeded but no indication of lightning or hail | Moderate convection but no lightning or hail |
| Orange | >=40 dBZ | VIR threshold exceeded but no indication of lightning or hail | Strong convection but no lightning or hail |
| Red/lightning icon | >35 dBZ | Indication of lightning but no indication of hail | Convection with potential for lightning |
| Magenta/hail icon | >35 dBZ | 45 Indication of hail | Convection with potential for hail |

In another illustrative example, enhanced weather radar mapping unit 106 may apply additional criteria to the weather radar reflectivity data and supplemental data, and apply additional graphical representations of certain weather hazard conditions beyond those described above and depicted in Table 1. For example, enhanced weather radar mapping unit 106 may distinguish between different levels of radar reflectivity in combination with detected lightning potential, and render map areas with different colors and/or icons to indicate different levels of precipitation together with lightning risk. Enhanced weather radar mapping unit 106 may also detect whether an area of sky is not properly characterized because it is behind an area of high precipitation that blocks or attenuates the radar signal from the more distant area of sky, an effect referred to as rain echo attenuation. In some examples, enhanced weather radar mapping unit 106 may apply a compensating technique for the rain echo attenuation effect, or Rain Echo Attenuation Compensation Technique (REACT). In some examples, enhanced weather radar mapping unit 106 may also detect whether data for a portion of sky has failed to refresh or update in a most recent radar scan or for a certain length of time, and graphically render a portion of the map in a particular color reserved for indicating missing or stale data. An example enhanced weather radar map graphical representation scheme incorporating these additional indications is summarized below in Table 2.

TABLE 2

Hazard levels vs. radar reflectivity and supplemental criteria

| Displayed color/icon | Max dBZ in column | Supplemental Criteria | Status |
|---|---|---|---|
| Black | <20 dBZ | VIR threshold is not exceeded | Low reflectivity; little or no convection |
| Green | >=20 dBZ | VIR threshold is not exceeded | Moderate or high reflectivity but stratiform; little or no convection |
| Yellow | <40 dBZ | VIR threshold exceeded but no indication of lightning or hail | Moderate convection but no lightning or hail |
| Orange | >=40 dBZ | VIR threshold exceeded but no indication of lightning or hail | Strong convection but no lightning or hail |
| Bright red/ lightning icon | <40 dBZ | Indication of lightning but no indication of hail | Moderate convection with potential for lightning |
| Scarlet/lightning icon | >=40 dBZ | Indication of lightning but no indication of hail | Strong convection with potential for lightning |
| Magenta/hail icon | Any dBZ | Indication of hail | Moderate or strong convection with potential for hail |
| Purple/Question mark icon | | Un-updated cell or detected Rain Echo Attenuation anywhere in column | Unknown conditions |

Where enhanced weather radar mapping unit 106 detects multiple conditions as listed in Table 1 or Table 2 in a single column of the weather radar data buffer, corresponding to a single vertical column of sky, enhanced weather radar mapping unit 106 may prioritize whichever status detected in the column has the highest priority, e.g., is furthest down on the table, and graphically render the corresponding portion of the enhanced weather radar map according to that highest priority status. Thus, for example, if enhanced weather radar mapping unit 106 determines that a particular column has no more than 4 adjacent cells of the column at greater than 20 dBZ, and no reflectivity above 35 dBZ above the altitude of the 0 degree phase transition, but the column also has at least one cell with missing or non-updated data or indication of rain echo attenuation, then enhanced weather radar mapping unit 106 may render the portion of the weather radar map as purple and/or with a question mark icon to represent unknown weather conditions, rather than green to indicate stratiform weather.

The example colors corresponding to different weather conditions as described above and herein are illustrative examples only, and enhanced weather radar mapping unit 106 may apply any other combinations of colors to represent different weather conditions in enhanced weather radar maps in different implementations. Additionally, some implementations may combine examples described above, such that, for example, enhanced weather radar mapping unit 106 may render areas with a moderate range of precipitation but with bright band detected as the same color as a low range of precipitation, e.g., in black; or enhanced weather radar mapping unit 106 may render areas with lightning or hail potential as the same color as areas with the highest range of radar reflectivity but with no lightning or hail potential, e.g., in red, but with lightning icons and hail icons superimposed on red areas where lightning or hail potential is indicated. Other examples of enhanced weather radar mapping unit 106 may apply any other graphical representation scheme (e.g., colors, shades, patterns, icons) to represent different portions of an enhanced weather radar map with indications of different levels and types of weather conditions and hazards. Certain weather radar reflectivity ranges may correlate, in the absence of distorting effects such as bright band, to particular levels of precipitation as shown below in Table 3.

TABLE 3

Radar reflectivity data (dBZ) and Precipitation Rate

| dBZ Level | Precipitation Rate (mm/hour) |
| --- | --- |
| <20 dBZ | <0.6 |
| 20-30 dBZ | 0.6-2.7 |
| 30-40 dBZ | 2.7-11.5 |
| >40 dBZ | >11.5 |

In some examples, the relations between radar reflectivity and precipitation rate set forth in Table 3 may not be applicable. For example, in some very high rainfall climates, it may be possible for stratiform rainfall by itself to exceed 40 dBZ in reflectivity. For aircraft operating in such conditions, a weather radar system of this disclosure may be configured to receive additional inputs and/or to make additional determinations to distinguish when a weather radar signal in a highest reflectivity range still meets criteria for a non-hazardous stratiform weather structure, or when a weather structure is stratiform despite having a high reflectivity across a broad span of the vertical columns of the weather radar signal. The additional inputs and/or additional determinations to distinguish when a weather radar signal in a highest reflectivity range still meets criteria for stratiform weather may include receiving external weather information indicating a weather structure to be stratiform, or determining via Global Navigation Satellite System (GNSS) (e.g., Global Positioning System (GPS)) or other position system that the location is climatically likely to have anomalously high rainfall rates in stratiform weather, for example. Enhanced weather radar mapping unit 106 may thus also evaluate position via GNSS/GPS as supplemental data to compare to radar reflectivity in determining how to render an enhanced weather radar map. Table 3 is merely one example of reflectivity ranges including a highest reflectivity range and one or more lower reflectivity ranges that may be used in determining fulfillment of criteria for the occurrence of bright band and for generating outputs that suppress or correct for bright band.

Enhanced weather radar mapping unit 106 thus may determine whether bright band effect is occurring and alter the weather radar output to suppress the bright band effect (e.g., generate a weather radar output with the bright band effect suppressed). Suppressing the bright band in the weather radar output (or generating the weather radar output with the bright band suppressed) may correctly indicate that the weather structure is stratiform rather than convective. Generating the weather radar output with the bright band suppressed may include modifying portions of the weather radar output that have exaggerated reflectivity due to bright band to represent those portions as having less than a selected apparent reflectivity in the output. For example, this may include modifying portions with bright band to represent those portions as having less than or equal to 40 dBZ, such that those portions are not graphically rendered in red in a weather radar graphical display output.

Enhanced weather radar mapping unit 106 may perform any of several techniques to determine whether portions of a weather radar signal are actually bright band rather than indicating a true rainfall rate above a selected hazardous threshold level. In some examples, as mentioned above, enhanced weather radar mapping unit 106 may use a technique that determines a vertically integrated reflectivity (VIR) of a vertical column of a weather structure, in order to determine whether or not the vertical column indicates convection, and whether or not the vertical column is affected by the bright band effect. Determining the VIR of a vertical column is further explained with reference to FIG. 3.

Figure 3:
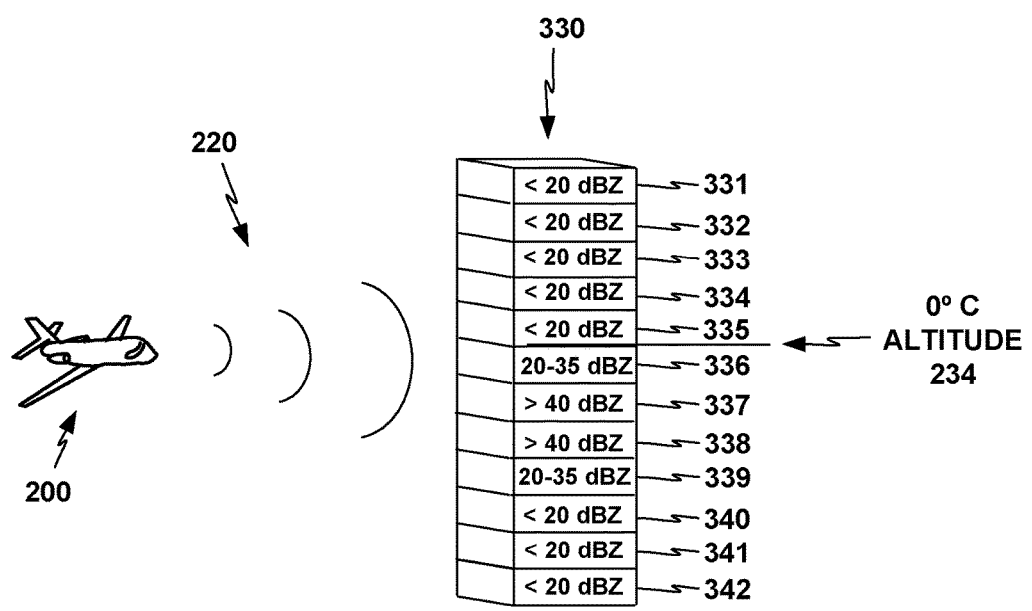
FIG. 3 shows a conceptual diagram of aircraft as in FIG. 2 emitting a weather radar signal at an example single vertical column of a weather structure above the Earth's surface, in accordance with example aspects of this disclosure.

FIG. 3 shows a conceptual diagram of aircraft 200 as in FIG. 2 emitting weather radar signal 220 at an example single vertical column 330 of a weather structure above the Earth's surface, in accordance with example aspects of this disclosure. Vertical column 330 of FIG. 3 corresponds to a stratiform weather structure 230 as in FIG. 2 with snow falling through a 0 degree Celsius altitude 234 and causing a bright band effect of localized exaggerated reflectivity in a bright band layer 236 in non-hazardous stratiform weather structure that actually has a moderate precipitation rate. In the example of FIGS. 2 and 3, aircraft 200 may use an enhanced weather radar processing system 104 that evaluates supplemental data to determine whether the weather structure is affected by effects outside of the nominal relationship between precipitation and radar reflectivity, and generates a two-dimensional weather map that may accordingly be conditioned or modified accordingly, e.g., with suppression of bright band.

For example, the enhanced weather radar processing system 104 of aircraft 200 may determine the VIR of vertical columns of sky throughout the range of the aircraft weather radar signals, including the representative vertical column 330 as shown in FIG. 3, to determine whether the vertical column is affected by secondary effects that depart from the nominal relationship between reflectivity and precipitation. Throughout the description herein, aircraft 200 may be considered in an example in which aircraft system 100 of FIG. 1 is carried aboard aircraft 200 and is enabled to function aboard aircraft 200, including to transmit weather radar signal 220, receive return weather radar signals from the emission of weather radar signal 220, and process the returned weather radar signals with enhanced weather radar processing system 104 including enhanced weather radar mapping unit 106.

In FIG. 3, weather structure vertical column 330 may be treated as being divided into individual portions 331-342 as shown, which may be three-dimensional "cells" or slices of space in vertical column 330 that may correspond to portions of vertical column 330 as it is represented in the returned weather radar signal received and analyzed by the weather radar system aboard aircraft 200. Individual cells 331-342 of column 330 are depicted in FIG. 3 with different reflectivity ranges in dBZ as detected by enhanced weather radar processing system 104 from the returned weather radar signal, and as loaded into a radar signal memory buffer in memory 124 and/or data storage 126 as shown in FIG. 1. Vertical column 330 is part of a stratiform weather structure 230 as shown in FIG. 2, which has a low to moderate precipitation rate and a bright band layer. As such, its individual cells 331-342 are fairly heterogeneous, with cells 331-335 and 340-342 above and below the bright band layer at less than 20 dBZ, while cells 336-339 mark the bright band layer, with reflectivity ranges of 20-35 dBZ or greater than 40 dBZ, indicative of moderate or high reflectivity.

The enhanced weather radar processing system 104 of aircraft 200 may determine the reflectivity of each of the individual portions 331-342 of vertical column 330 as shown, and then enhanced weather radar mapping unit 106 aboard aircraft 200 may determine the VIR of vertical column 330. In particular, enhanced weather radar mapping unit 106 may first receive the reflectivity information for portions 331-342. Enhanced weather radar mapping unit 106 may then check whether any of the portions 331-342 have a reflectivity dBZ in the highest reflectivity range of over 40 dBZ in the reflectivity range divisions applicable in this example. Enhanced weather radar mapping unit 106 may detect that cells 337 and 338 have reflectivity above 40 dBZ. In response to determining that at least one of the portions of vertical column 330 is in the highest reflectivity range of greater than 40 dBZ, enhanced weather radar mapping unit 106 may then proceed to determine the VIR of the vertical column 330.

In determining the VIR of a vertical column, enhanced weather radar mapping unit 106 may sum up the values of reflectivity of each of the portions 331-342 of vertical column 330. For example, enhanced weather radar processing system 104 may determine the twelve values of reflectivity for the twelve portions 331-342 of vertical column 330 each to be at different values, with many of the cells at less than 20 dBZ. Enhanced weather radar mapping unit 106 may determine the sum of reflectivities of each of the twelve portions 331-342 of vertical column 330. Given the low reflectivity of many of the portions 331-342 across large vertical extents of vertical column 330, enhanced weather radar mapping unit 106 determines a relatively low VIR for vertical column 330, below a selected threshold VIR stored or determined by enhanced weather radar mapping unit 106 for corresponding to bright band rather than a true high precipitation rate.

Since the VIR of vertical column 330 is determined to be below a threshold VIR in this example, enhanced weather radar mapping unit 106 determines that vertical column 330 is affected by the bright band effect. Enhanced weather radar mapping unit 106 may perform this same process of VIR evaluation for bright band effect on each of several vertical columns of a weather structure as represented in a received weather radar signal across two or three horizontal dimensions, and may continue performing this bright band analysis process on all the available vertical columns at ongoing or regular intervals over time.

The specific selected threshold VIR may vary widely in different examples and in different contexts within a given example. The specific selected threshold VIR may also be scaled relative to the number of vertical portions into which a vertical column in space is divided, in a data binning that may be performed by enhanced weather radar processing system 104 and/or in an analysis performed by enhanced weather radar mapping unit 106. In the example above in which the vertical column is divided into twelve portions, in one example, enhanced weather radar mapping unit 106 may store or set a threshold VIR of 432 dBZ (e.g., 90% of 40 dBZ times 12 for the twelve portions into which the vertical column is partitioned in this example). In other examples also with the vertical column is divided into twelve portions, enhanced weather radar mapping unit 106 may store or set a threshold VIR of higher or lower values, such as 480 dBZ or 334 dBZ (e.g., 100% or 80%, respectively, of 40 dBZ times 12 for the twelve portions into which the vertical column is partitioned in this example), or any of a wide range of other values that may be correlated or calibrated to specific conditions in accordance with engineering refinements (e.g., scaled for number of partitions, or calibrated after field testing in comparison with independent methods of characterizing weather structures). Enhanced weather radar mapping unit 106 may use any of a wide variety of other VIR thresholds in other examples in which it may use other numbers of portions into which it divides or partitions a vertical column. Enhanced weather radar mapping unit 106 may also apply other techniques and criteria besides VIR to determine whether a vertical column is affected by bright band, as further explained below.

In the example as described above, because enhanced weather radar mapping unit 106 determines that vertical column 330 is affected by bright band, enhanced weather radar mapping unit 106 causes enhanced weather radar processing system 104 to generate a weather radar output that is modified for bright band suppression. Enhanced weather radar processing system 104 may communicate this output to weather radar graphical display device 108 which may generate a graphical rendering of the weather radar output with a portion corresponding to vertical column 330 shown in green, for example, as set forth in Tables 1 and 2 above.

Figure 4:
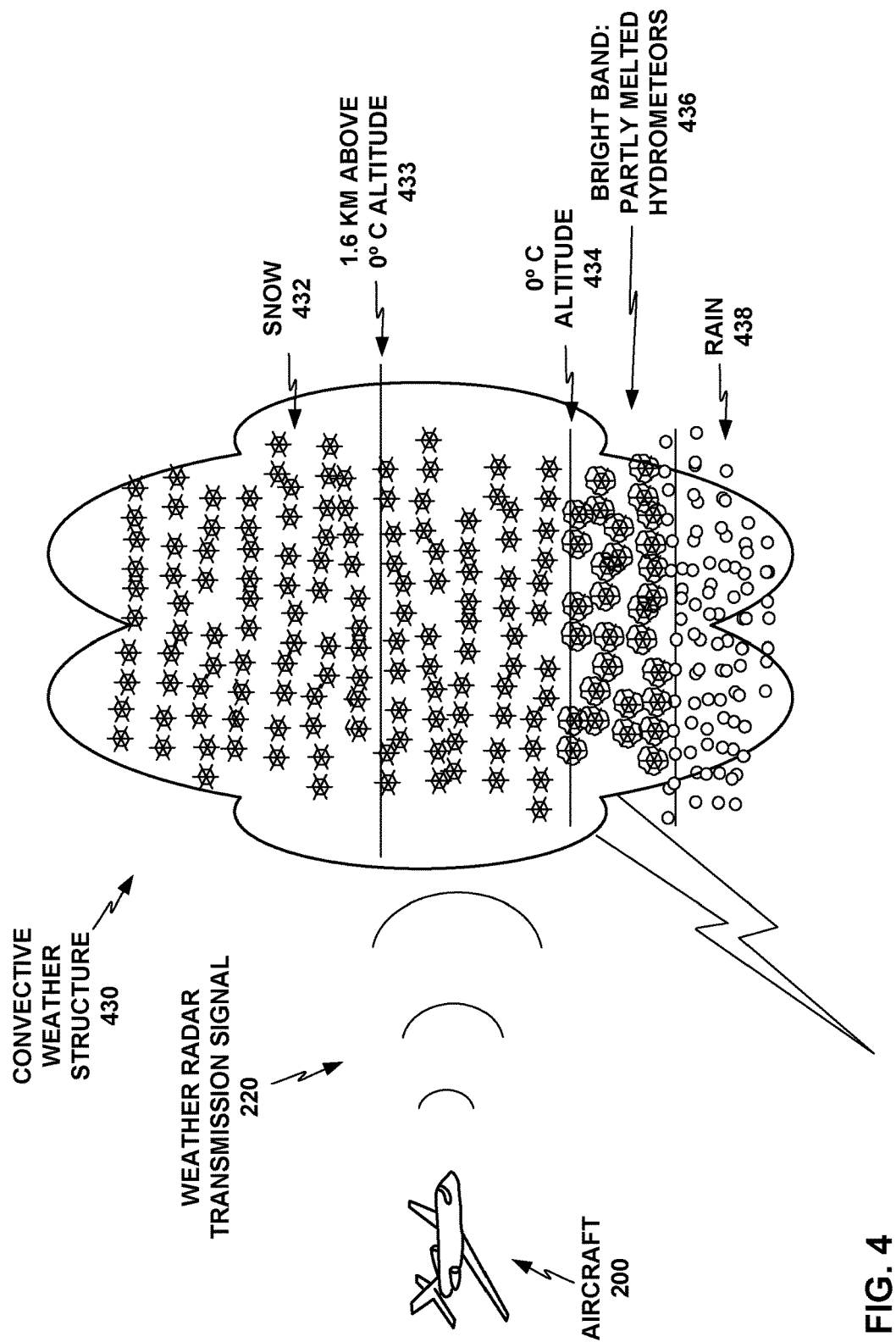
FIG. 4 shows a conceptual diagram of an aircraft emitting a weather radar signal at a different weather structure that is convective, in accordance with example aspects of this disclosure.

FIG. 4 shows a conceptual diagram of aircraft 200 emitting weather radar signal 220 at a different weather structure 430 that is convective, in accordance with example aspects of this disclosure. Weather structure 430 includes a large snow layer 432 at a high altitude range; a phase transition altitude 434, at which ambient temperature and pressure conditions change from frozen conditions above to liquid water conditions below; a partially melted hydrometeor layer 436 (also referred to as bright band layer 436) at an intermediate altitude range; and a rain layer 438 at a lower altitude range, where the partially melted hydrometeors have fully melted into rain. The partially melted hydrometeor layer 436 is likely to cause a bright band phenomenon in the received signal from weather radar signal 220. The bright band readings from partially melted hydrometeor layer 436 are likely to induce an exaggerated reflectivity relative to the nominal relationship between rate of precipitation and reflectivity, as described above. However, weather structure 430 also has higher precipitation rates than weather structure 230 of FIG. 2, translating to higher radar reflectivity values for much of its altitude range. Weather structure 430 also has snow layer 432 spanning an altitude level 433 at approximately 1.6 kilometers (km) (approximately 0.86 nautical miles or approximately 0.99 statute miles) above the 0 degree Celsius altitude 434.

Enhanced weather radar mapping unit 106 may determine the VIR of vertical columns of radar signal in order to determine whether the vertical columns are affected by bright band. Enhanced weather radar mapping unit 106 also measures the outside temperature, models the variation of temperature over altitude, and compares the temperature over altitude with the radar signal. Enhanced weather radar mapping unit 106 may thereby determine that the reflectivity values of vertical columns of sky corresponding to weather structure 530 are dominated by high reflectivity over much of their range, and that they include very high reflectivity above the freezing altitude 434, and thus that weather structure 530 poses a risk of lightning and a risk of hail, which also correlate with high risk of convection, as further described below with reference to FIG. 5.

Figure 5:
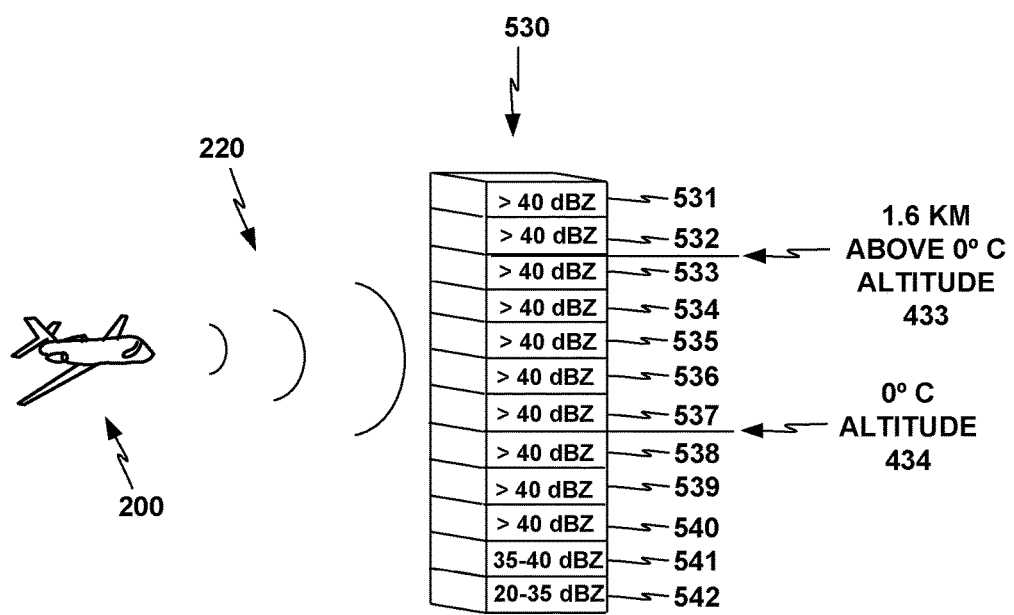
FIG. 5 shows a conceptual diagram of an aircraft as in FIG. 4 emitting a weather radar signal at an example single vertical column of a weather structure above the Earth's surface, in accordance with example aspects of this disclosure.

FIG. 5 shows a conceptual diagram of aircraft 200 as in FIG. 4 emitting weather radar signal 220 at an example single vertical column 530 of a weather structure above the Earth's surface, in accordance with example aspects of this disclosure. Vertical column 530 of FIG. 5 corresponds to convective weather structure 430 as in FIG. 4, which also has snow falling through a 0 degree Celsius phase transition layer 434 and causing a bright band effect of localized exaggerated reflectivity in a bright band layer 436, but in a convective and hazardous weather structure that has a high precipitation rate. In the example of FIGS. 4 and 5, aircraft 200 may use an enhanced weather radar processing system 104 that evaluates supplemental data to determine whether the weather structure 430 is affected by effects outside of the nominal relationship between precipitation and radar reflectivity, and generates a two-dimensional weather map that may accordingly be conditioned or modified accordingly, e.g., with indication of high convection and of a risk of hail.

In FIG. 5, enhanced weather radar mapping unit 106 may evaluate weather structure vertical column 530 as being divided into individual portions 531-542 as shown, as three-dimensional cells or slices of space in vertical column 530 that may correspond to portions of vertical column 530 as it is represented in the returned weather radar signal received and analyzed by enhanced weather radar processing system 104 aboard aircraft 200. Individual portions 531-542 are also depicted with reflectivity ranges that may indicate reflectivity in dBZ as determined from the returned weather radar signal received by aircraft 200. As opposed to the example of FIG. 3, vertical column 530 in FIG. 5 includes a weather structure affected by bright band, but within a very convective weather structure. As such, column 530 includes individual cells 531-537 dominated by high snowfall and cells 538-541 with partially melted hydrometeors, all with homogenously high reflectivity. Only the lowest depicted cell 542 has somewhat more moderate reflectivity, where the hydrometeors have fully melted into rainfall with a much higher terminal velocity through the atmosphere that reduces the density and thus reflectivity of the hydrometeors relative to the snow and bright band layers above.

As in the example above, enhanced weather radar processing system 104 with enhanced weather radar mapping unit 106 of aircraft 200 may determine the reflectivity of each of the individual portions 531-542 of vertical column 530 as shown. Enhanced weather radar mapping unit 106 may then receive the reflectivity information for cells 531-542. Enhanced weather radar mapping unit 106 may determine that cells 531-540 all have a reflectivity dBZ in the highest reflectivity range of over 40 dBZ in the reflectivity range divisions applicable in this example, and that cells 541 and 542 have reflectivity ranges of 35-40 dBZ and 20-35 dBZ, respectively. Enhanced weather radar mapping unit 106 may determine the VIR of the vertical column 530 to be in a highest range of total VIR, and that reflectivity above 40 dBZ occurs above the altitude 433 at approximately 1.6 km above the freezing transition altitude 434. Enhanced weather radar mapping unit 106 may thus determine that the portion of weather structure 430 represented by column 530 poses a risk of hail, because it includes reflectivity above 40 dBZ occurs above the altitude 433 at approximately 1.6 km above the freezing transition altitude 434. Enhanced weather radar mapping unit 106 may thus render the portion of an enhanced weather radar map corresponding to column 530 with a graphical indication of a risk of hail, e.g., magenta color and/or a hailstone icon as shown in Tables 1 and 2 above.

Enhanced weather radar mapping unit 106 may also perform analogous analyses on multiple vertical columns of the same weather structure, and in some examples may perform this analysis on vertical columns covering the entire received radar signal covering the weather structure. Enhanced weather radar mapping unit 106 may determine that each of several other columns surrounding column 530 corresponding to weather structure 430 also show a maximum reflectivity range (e.g., over 40 dBZ) above the altitude 433 at approximately 1.6 km above the freezing transition altitude 434. Enhanced weather radar mapping unit 106 may depict the entire area of the enhanced weather radar map output corresponding to those columns with graphical depictions of the risk of hail. Although these columns may also show indication of bright band effect in the altitude band below the freezing point threshold altitude 434, the fact of bright band in the columns is superseded by the priority of depicting the indicated hail risk, which shows that the weather structure 430 actually is very convective and hazardous.

Figure 6:
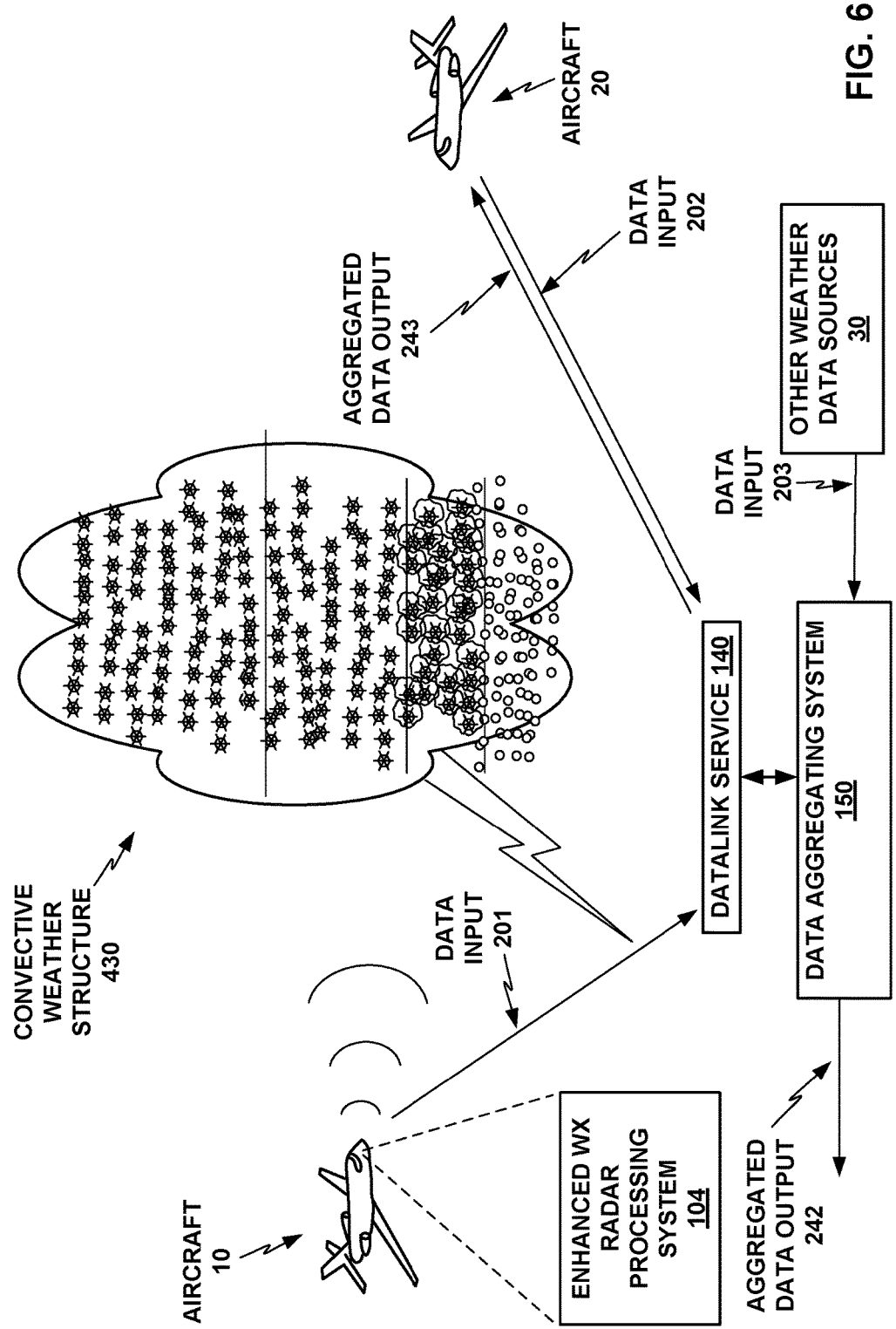
FIG. 6 depicts a conceptual diagram of an example data aggregating system configured to aggregate enhanced weather radar mapping data from enhanced weather radar processing systems from potentially large numbers of aircraft, in accordance with example aspects of this disclosure.

FIG. 6 depicts a conceptual diagram of an example data aggregating system 150 configured to aggregate enhanced weather radar mapping data from enhanced weather radar processing systems 104 from potentially large numbers of aircraft including representative aircraft 10 and 20, in accordance with example aspects of this disclosure. In various examples, data aggregating system 150 may collect, aggregate, and redistribute enhanced weather radar mapping data from enhanced weather radar processing systems 104 from any suitable number of aircraft, and from any suitable number of other, non-aircraft data sources 30. Thus, although two aircraft 10, 20 are shown in FIG. 6, in other examples, system 150 may be used with any suitable number of aircraft (e.g., more than two aircraft) and any suitable number of other data sources 30 (e.g., one or more non-aircraft data sources). Further, any of the features of data aggregating system 150 as described herein may be used in any suitable combination.

In the example shown in FIG. 6, aircraft 10 and 20 each include an enhanced weather radar processing system 104 with an enhanced weather mapping unit 106 as in FIG. 1. Aircraft 10, 20 may downlink enhanced weather radar mapping data to data aggregating system 150. Aircraft 10 and 20 each include a datalink system that communicates with data aggregating system 150 via datalink service 140. The communication from each aircraft 10 and 20 to datalink system 150 may be regular in some examples (e.g., at a predetermined frequency of time), or may be less regular in other examples (e.g., only upon request by system 150, by request from a flight crew or ground crew, or the like).

Data aggregating system 150 receives enhanced weather mapping data from aircraft 10 and 20 and potentially also receives weather data from other aircraft and/or non-aircraft data sources 30. Aircraft 10 is configured to communicate with data aggregating system 150 by datalink communication via datalink service 140, which may include various space-based, airborne, and/or ground-based transceivers, communication relays, or other assets, as further described below with reference to FIG. 7. Aircraft 10 may thereby communicate enhanced weather radar mapping data to data aggregating system 150 via datalink service 140. Similarly, aircraft 20 may downlink its own enhanced weather radar mapping data that aircraft 20 collects to data aggregating system 150.

The various data gathering assets, such as representative aircraft 10 and 20 and other data sources 30 as shown in FIG. 6 (collectively, "weather data gathering assets 10-30," representative of any number and variety of weather data gathering assets), may transmit data they respectively collect, such as representative data inputs 201, 202, 203 from aircraft 10 and 20 and other data sources 30, respectively, to data aggregating system 150 via datalink service 140 and/or other communication means. Data gathering assets 10-30 as shown in FIG. 6 are representative examples of weather data collecting systems, which may also include any number of aircraft, other air-based weather radar and/or weather sensing platforms, ground-based weather radar and/or weather sensing systems, sea-based weather radar and/or weather sensing platforms, satellites or other space-based weather radar and/or weather sensing platforms, and various other vehicles, platforms, or assets equipped with weather radar and/or weather sensing systems.

Data aggregating system 150 may thus receive weather data from aircraft 10 and 20 and from any number of other aircraft that may be in range of at least one datalink asset of datalink service 140. Data aggregating system 150 may also receive data from additional, non-aircraft data sources 30, such as ground-based weather radar stations, that may downlink or communicate data to data aggregating system 150 via datalink service 140 or via direct communicative connection or other means.

Data aggregating system 150 is configured to generate aggregated enhanced weather data outputs 242, 243 that constitute aggregated sets of enhanced weather data from multiple sources. Data aggregating system 150 may generate aggregated enhanced weather data outputs 242, 243 based on data from potentially large numbers both of enhanced weather radar processing systems 104 from various aircraft, and additional, non-aircraft data sources 30. Data aggregating system 150 may communicate aggregated enhanced weather data outputs 242 to recipients such as aircraft operators, and subscribers to an aggregated weather data service provided via datalink service 140, the Internet, or other communication means, and may communicate aggregated enhanced weather data outputs 243 back to enhanced weather radar processing systems 104 of various aircraft (e.g., aircraft 20) that communicate their enhanced weather data to data aggregating system 150. Data aggregating system 150 may thus enable each enhanced weather radar processing systems 104 onboard the various aircraft 10, 20 to graphically display enhanced weather radar maps based on weather data that is also generated by other enhanced weather radar processing systems 104 onboard other aircraft, as well as additional weather data from other weather data sources 30.

For example, the enhanced weather radar processing unit 106 onboard aircraft 10 may detect that portions of convective weather structure 430 on the far side of convective weather structure 430 from aircraft 10 are obscured by the strong reflectivity of the nearer portions of convective weather structure 430 and are thus affected by rain echo attenuation. However, enhanced weather radar processing unit 106 may then receive additional data from data aggregating system 150 that includes enhanced weather mapping data from an enhanced weather radar processing unit 106 onboard aircraft 20 that accurately and clearly characterizes the portions of weather structure 430 nearer to aircraft 20 that fill in the gaps in data affected by rain echo attenuation for the enhanced weather radar processing unit 106 onboard aircraft 10. The enhanced weather radar processing unit 106 onboard aircraft 10 may thus graphically render the portions of an enhanced weather radar map corresponding to those areas of the sky accurately, e.g., as showing risk of hail (e.g., in scarlet or with a hailstone icon as in Table 2), instead of as missing data (e.g., in purple or with a question mark icon as in Table 2).

Datalink service 140 may include and/or make use of one or more ground-based datalink assets, one or more telecommunication satellites, and potentially additional weather data sources, as further described below with reference to FIG. 7. Data aggregating system 150 may use datalink service 140 to gather data from various weather data collecting assets, including and potentially beyond aircraft 10, 20 and at least some of non-aircraft data sources 30 as shown in FIG. 6. For example, data aggregating system 150 may also collect, receive, and aggregate data from weather data collecting drones or unmanned aerial vehicles (UAVs), marine-based weather radar systems installed or carried on marine vessels, oil platforms, or other marine vehicles or marine assets (not shown in FIG. 6), and/or any of a wide variety of other assets that may collect any type of data relevant to weather. Weather satellites may scan weather formations in microwave, infrared, or other wavelength from Earth orbit, for example. Ground-based weather radar systems may be part of a network of ground-based weather radar systems such as the Next Generation Weather Radar System (NEXRAD) radar network operated by the National Weather Service in the United States, for example.

In some examples, data aggregating system 150 may aggregate weather data from a large number and variety of different weather data sources, including potentially intermediate weather data service providers that may themselves aggregate weather data from various sources. For example, data aggregating system 150 may aggregate weather data directly from the sources and/or from intermediate weather data aggregating services that may provide weather data from NEXRAD, satellite cloud height data, wind aloft data, temperatures aloft data, echo top and storm movement data, AIRMET data, SIGMET data, lightning data, CONUS radar coverage mask data, Clear Air Turbulence (CAT) data, and Storm Cell Info Tracking (SCIT) data, for example. Data aggregating system 150 may be ground-based, e.g., at a centralized information service provider, or at an airline company operations center, in some examples. Aircraft 10, 20 (via their onboard enhanced weather radar processing systems 104) and the other data gathering assets 30 may each, via weather radar and/or other weather data collecting means, characterize the weather (e.g., provide radar reflectivity, color-coded by hazard level, of each position in a volume of space covered by a radar scan; provide an air temperature at the aircraft's position; or the like or any combination thereof) of at least partially overlapping portions of a volume of space of the sky during an at least partially overlapping time interval, as conceptually depicted in FIG. 6.

Data aggregating system 150 is configured to transmit aggregated weather data outputs 243 to recipients including aircraft 20. For example, aircraft 20 may be in receiving range but not transmitting range of a datalink satellite or other datalink asset of datalink service 140, and aircraft 20 may receive aggregated data outputs 243 from data aggregating system 150 via datalink service 140.

Aircraft 10 may also receive aggregated weather data 243 from data aggregating system 150, and update its weather data displays for its flight crew based on the aggregated weather data outputs it receives from data aggregating system 150. Data aggregating system 150 may thus provide its recipients with updated weather data with improved accuracy based on aggregated weather data outputs, which may be more extensive and more accurate than data from any individual source.

Data aggregating system 150 is thus configured to receive weather data from one or more relaying aircraft 10 and/or 20. Data aggregating system 150 is further configured to receive data from one or more non-aircraft data sources 30; aggregate the composite weather data from one or more of aircraft 10, 20 and the weather data from the one or more non-aircraft data sources 30, thereby generating an aggregated data set; and generate aggregated data outputs 242, 243 based at least in part on the aggregated data set.

In some examples, data aggregating system 150 may communicate the aggregated data outputs with low latency or delay (e.g., within a selected interval of milliseconds, seconds, or minutes, in different examples) so that recipients receive the aggregated data outputs while the data is still up-to-date, and, in some examples, also still relevant to the current position of the aircraft. Aircraft onboard system recipients of the aggregated data outputs may generate a display of or based on the aggregated data outputs (e.g., multiple aggregated data outputs refreshed frequently) on a cockpit display, such as may be implemented as a part of an enhanced weather radar display system, or in any other form that may be useful to a pilot or flight crew operating a recipient aircraft, or useful to any other system aboard the recipient aircraft.

For example, data aggregating system 150 may transmit or communicate its aggregated data outputs to one or more recipients within a nominal latency of receiving the weather data from the various participating aircraft and other data sources. In some examples, the nominal latency of providing the aggregated data outputs may be characterized in accordance with aviation data latency standards for externally sourced data provided to recipient aircraft or other recipients. For example, data latency standards in the aviation industry may specify overall data latency driven by requirements of systems or applications that use the data. Industry standards may establish common time reference so consumers of weather data are able to determine the age of the data.

In some examples, the nominal latency may also be characterized by expectations of data delay or data freshness by pilots operating the recipient aircraft, at least in comparison with traditional weather radar systems. For example, the nominal latency may be characterized by pilots and/or air traffic authorities considering it close enough to real-time to enable pilots to use it for effectively and safely operating the recipient aircraft, in accordance with industry and regulatory standards. Although nominal latency may be defined using any suitable standard, in some examples, the nominal latency may involve a typical total round-trip latency, between the one or more reporting aircraft transmitting their weather data to data aggregating system 150, and receiving the aggregated data outputs in a form rendered on their cockpit displays. In various examples, a nominal data latency delay may be various ranges between a fraction of a second and a number of minutes. Data aggregating system 150 may thus be configured in some examples to generate aggregated weather data outputs 242, 243 within a nominal latency of receiving the composite weather data from the one or more relaying aircraft 10, 20.

Figure 7:
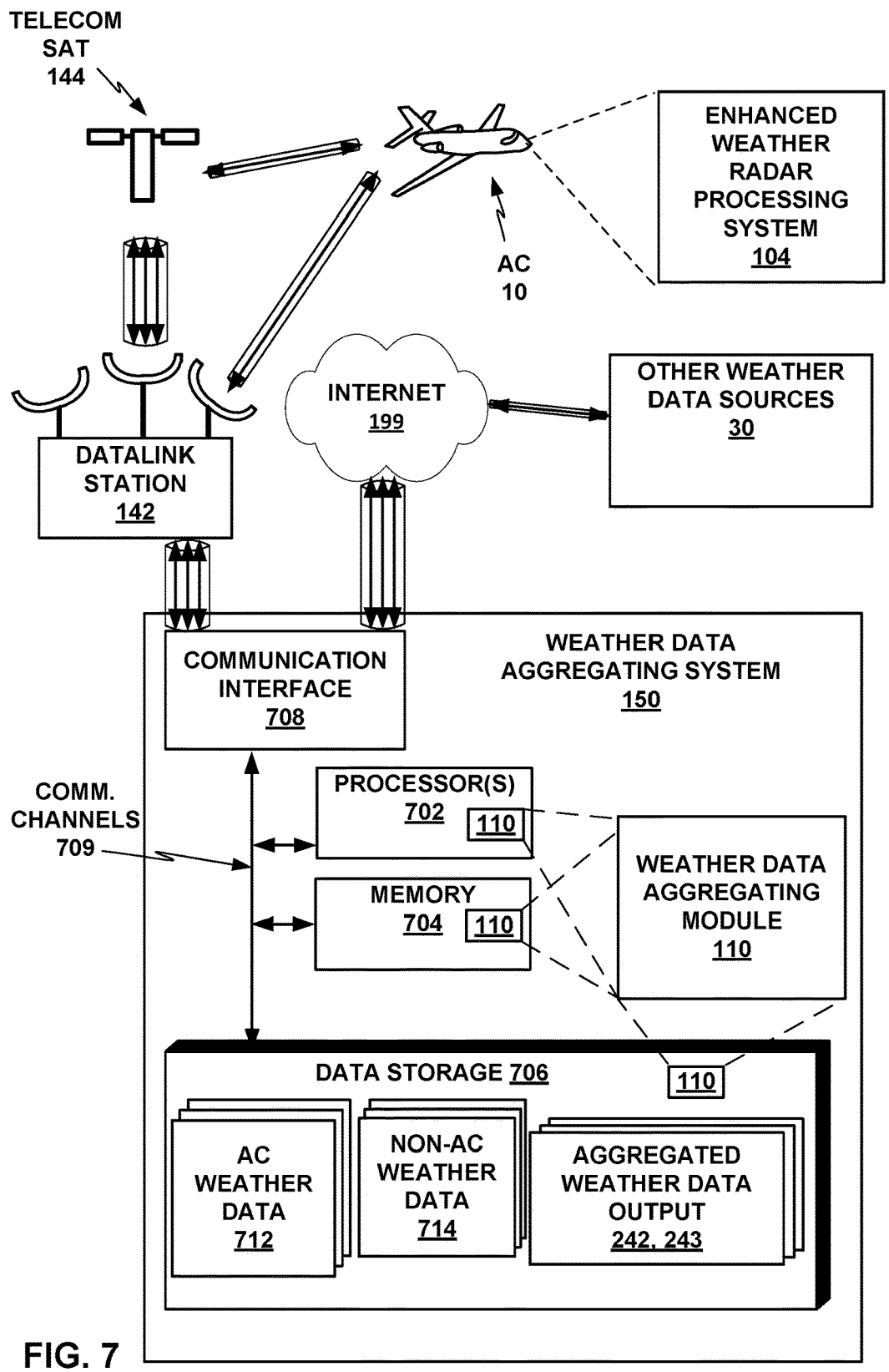
FIG. 7 depicts a conceptual diagram of an aircraft equipped with an example onboard data relaying system in communicative connection via a datalink service with a data aggregating system, in accordance with example aspects of this disclosure.

FIG. 7 depicts a conceptual diagram of an aircraft 10 equipped with an example onboard data relaying system (such as aircraft system 100 of FIG. 1) in communicative connection with data aggregating system 150, e.g., via datalink station 142 and/or telecommunications satellite 144, in accordance with example aspects of this disclosure. Data aggregating system 150 is configured to receive weather data from multiple aircraft and other data sources via datalink service 140 and other communication systems, aggregate the weather data, and output aggregated data outputs composed of aggregated collections of the weather data. FIG. 7 provides additional detail of some examples corresponding to FIG. 6.

In the example of FIG. 7, datalink service 140 as shown in FIG. 6 includes one or more datalink stations such as representative datalink station 142 and one or more telecommunications satellites such as representative telecommunications satellite 144. FIG. 7 also shows aircraft 10 and other non-aircraft data sources 30 as in FIG. 6. Telecommunications satellite 144 may be configured to maintain radio broadband datalink connections 132 with aircraft 10. Telecommunications satellite 144 and datalink station 142 may be configured to maintain a radio broadband datalink connection 134 with each other.

Datalink station 142 may also be configured to maintain hard-line broadband network connections 136 with ground-based weather radar station 44 and with data aggregating system 150. Datalink station 142 may also communicate directly with aircraft 10 using point-to-point data communication channel 135, such as an implementation of Flight Information Services-Broadcast (FIS-B). Assets such as datalink station 142 and telecommunications satellite 144 may thus implement datalink service 140 to maintain broadband datalink connections among aircraft 10 and 20, data aggregating system 150, and other data collecting assets and aggregated data recipients.

In some examples, telecommunications satellite 144 may be equipped with broadband capability, such as Ka band datalink transmission and reception capability, in some examples. In one example, telecommunications satellite 144 may be a Global Xpress (GX) satellite operated by Inmarsat PLC of London, United Kingdom. Telecommunications satellite 144 may be in geosynchronous Earth orbit (GEO) and may provide coverage over a large area of the Earth in some examples, and may interoperate with additional comparable telecommunications satellites that may provide complementary coverage over other large sections of the Earth, in some examples. Datalink service 140 may also be configured to include or operate with other types of remote coverage broadband datalink systems, such as broadband datalink connections implemented by drones or automated airships, for example.

In some examples, data aggregating system 150 may also have a communicative connection (e.g., via datalink and/or hard-line broadband network connections) with certain other non-aircraft weather data sources 30, which may include one or more ground-based weather stations, marine-based weather radar systems, space-based weather satellites, and/or weather data services, for example. Data aggregating system 150 may receive weather data from any of these other non-aircraft data sources 30 via hard-line broadband network connections 136 or another suitable communication link, and aggregate the weather data from any of these other non-aircraft data sources 30 with the weather data that data aggregating system 150 receives from at least some of aircraft 10, 20, and other weather data sources 30.

Aircraft 10, 20 and other weather data sources 30 are thus enabled to communicate weather data to data aggregating system 150. Data aggregating system 150 is thus enabled to receive weather data from various aircraft and from various non-aircraft sources, to aggregate the data from the aircraft and other sources, and to communicate the aggregated data to recipients. In other examples, the onboard data relaying system of aircraft 10 and data aggregating system 150 may use any other implementation of data connection to communicate data with each other.

In some examples, datalink station 142 includes radio transmission and reception equipment (e.g., a Ka band radio interface) configured to maintain broadband datalink communications with various aircraft and other data sources directly and/or via other elements of datalink service 140 as shown in FIGS. 1 and 2, in accordance with one example of this disclosure. Data aggregating system 150 as shown in FIG. 7 may be a more detailed view of some examples of data aggregating system 150 as shown in FIG. 6.

As shown in FIG. 7, data aggregating system 150 includes one or more processors 702 ("processors 702"), one or more memory components 704 ("memory 704"), one or more data storage devices 706 ("data storage 706"), and a communication interface (CI) 708 (e.g., including a network interface or bus interface), which is connected to one or more of the other components of data aggregating system 150 via communication channels 709 (e.g., a system bus) and communicatively coupled via datalink station 142 to other elements of datalink service 140. Data aggregating system 150 is thus configured to communicate with various aircraft and other data sources as shown in FIG. 6 via datalink service 140.

In data aggregating system 150, the processors 702, memory 704, data storage 706, and communication interface 708 are interconnected by communication channels 709, such as a bus or communication fabric, for transporting or communicating data and instruction code between processors 702, memory 704, data storage 706, and communication interface 708. Processors 702 may include one or more central processing units (CPUs), one or more CPU cores, one or more graphical processing units (GPUs), one or more digital signal processors (DSPs), one or more application-specific integrated circuits (ASICs), one or more field programmable gate array (FPGAs), or any other type of processing units or other discrete or integrated logic circuitry. Functions attributed to processors 702 may be embodied as software, firmware, hardware, and combinations thereof.

Memory 704 may include any form of working memory, such as any form of random access memory (RAM), cache circuits, and/or one or more volatile or more or less short-term data storage devices. In some examples, memory 704 may host in-memory data stores. Data storage 706 may include any form of hard disc drives, redundant array of independent discs (RAID), Flash drives, cloud storage, or any other form of data storage, and may host any form of databases, schemaless data stores, or any type of data stores. Data aggregating system 150 may process incoming data and outgoing data via communication interface 708, which may include interface subsystems for managing data communication with external resources such as datalink station 142 and datalink service 140, and one or more public and/or private networks such as the Internet 199. Communication interface 708 may include circuitry and hardware for receiving and processing data from datalink station 142 and for communicating data to datalink station 142. Data aggregating system 150 may receive data from one or more non-aircraft data sources 30 via hard-line broadband connections through the Internet 199 or another suitable communication system.

Data aggregating system 150 has a weather data aggregating module 110 installed thereon. Weather data aggregating module 110 may include or be a software application, software library, or any other form or set of software stored in data storage 706, loaded in memory 704, and/or executed by processors 702. Weather data aggregating module 110 may include or be any form of executable software instruction code, including a stand-alone application, one or more portions of an executable software application, a software library or collection of applications, processes, and/or microservices, a library of multiple executable software applications and associated classes, methods, processes, objects, functions, routines, or other resources, or other any other form of executable software instruction code. Weather data aggregating module 110 may also include or be implemented as or with specialized hardware such as one or more application-specific integrated circuits (ASICs), one or more field programmable gate arrays (FPGAs), and/or one or more graphical processing units (GPUs).

Weather data aggregating module 110 may configure processors 702 (or other processing hardware elements) to receive sets of data from multiple sources, such as enhanced weather data sets from aircraft 10, 20 and non-aircraft weather data sets from non-aircraft data sources 30. Weather data aggregating module 110 may further configure processors 702 (or other processing hardware elements) to perform comparison of sets of weather radar data and/or other weather data from multiple sources. These and other functions and capabilities for which data aggregating module 110 may configure processors 702 are further described below.

Weather data aggregating module 110 may generate aggregated data outputs 242, 243 based on enhanced weather data sets 712 from aircraft 10, 20 and non-aircraft weather data sets 714, as further explained below. Weather data aggregating module 110 may at least temporarily load and/or store aggregated data outputs 242, 243 in memory 704 and/or data storage 706. Weather data aggregating module 110 may output aggregated data outputs 242, 243 for communication via communication interface 708 and potentially via datalink station 142 and datalink service 140, Internet 199, and/or other modes of communication to recipients of the aggregated data.

Data aggregating system 150 thus includes one or more processors 702 configured to receive enhanced weather data from one or more relaying aircraft 10, 20, wherein the enhanced weather data comprises enhanced weather data from one or more aircraft 10, 20. One or more processors 702 of data aggregating system 150 are further configured to receive weather data from one or more non-aircraft data sources 30, aggregate the enhanced weather data from one or more aircraft 10, 20 and the weather data from the one or more non-aircraft data sources, thereby generating an aggregated enhanced weather data set, and generate an aggregated weather data outputs 242, 243 based at least in part on the aggregated enhanced weather data set.

In some examples, one or more processors 702 of data aggregating system 150 may apply a subscriber agreement in managing and periodically confirming or modifying a list of its recipients to which to transmit the aggregated data outputs 242, 243. For example, data aggregating system 150 may provide transmissions to different recipients in accordance with terms of service subscriptions with clients associated with the recipients, such as airlines or other operators of aircraft fleets, or web interface weather data clients with different subscription plans for different levels of data. The recipients may also include entities other than operators of the aircraft, who may have different subscription terms, such as for occasional communications of aggregated weather data sets in bulk data form rather than for transmitting aggregated weather data sets in nominal real-time as with recipient aircraft in flight. Non-aircraft recipients may include a data mining system or an operator thereof, for example, that may analyze the aggregated weather data sets for additional useful purposes. Non-aircraft recipients may include an air navigation service provider (ANSP), a jurisdictional aviation regulatory authority, an aeronautics agency, an academic research body, or other enterprise, any of which may subscribe to receive the aggregated weather data sets in nominal real-time and/or in periodic bulk data.

As another example of a non-aircraft recipient subscribed to receive the aggregated weather data sets from data aggregating system 150 in nominal real-time, an airline, aviation authority, or other enterprise may monitor the separations between the aircraft in the airspace. The enterprise may evaluate the aggregated weather data sets, and may communicate to the flight crew of the target aircraft to provide recommendations to the flight crew regarding when they may likely be cleared to a more fuel-efficient or desirable altitude or heading. In some examples, this datalink advisory could be detected by the aircraft's flight management system (FMS) or other automated process or system and be presented to the flight crew of the target aircraft as a pre-optimized recommendation. The FMS may compute when the target aircraft should climb to a new altitude and the advisory service or enterprise may know when the target aircraft is likely to be able to receive a clearance to climb. Combining these two elements of information may enable the FMS to recommend a course change request such as a climb request only when the course change request is likely to be granted.

As yet another example of a non-aircraft recipient subscribed to receive the aggregated weather data sets from data aggregating system 150 in real-time, an aviation authority may use this service to monitor weather. The aviation authority may revise flight plans or clearances to enable more fuel-efficient and denser flight traffic in accordance with the aviation authority's real-time evaluation of the aggregated weather data sets, potentially in combination with additional data or external conditions.

While the example of FIGS. 6 and 7 shows a single integrated data aggregating system 150 hosted at a single ground station, data aggregating system 150 may take a wide variety of other forms in other implementations. For example, data aggregating system 150 may be implemented across multiple assets such as geographically distributed data centers. In other examples, data aggregating system 150 or a control interface thereof may be implemented on a single mobile device such as a laptop or smartphone. In other examples, data aggregating system 150 may be hosted on one or more aircraft, which may coincide with one or more of the aircraft described above, such as example aircraft 10, such that all of the functions of data aggregating system 150 are performed on board aircraft 10. In other examples, data aggregating system 150 may be hosted on one or more space-based assets, which may coincide with telecommunications satellite 144 and/or one or more additional satellites.

Figure 8:
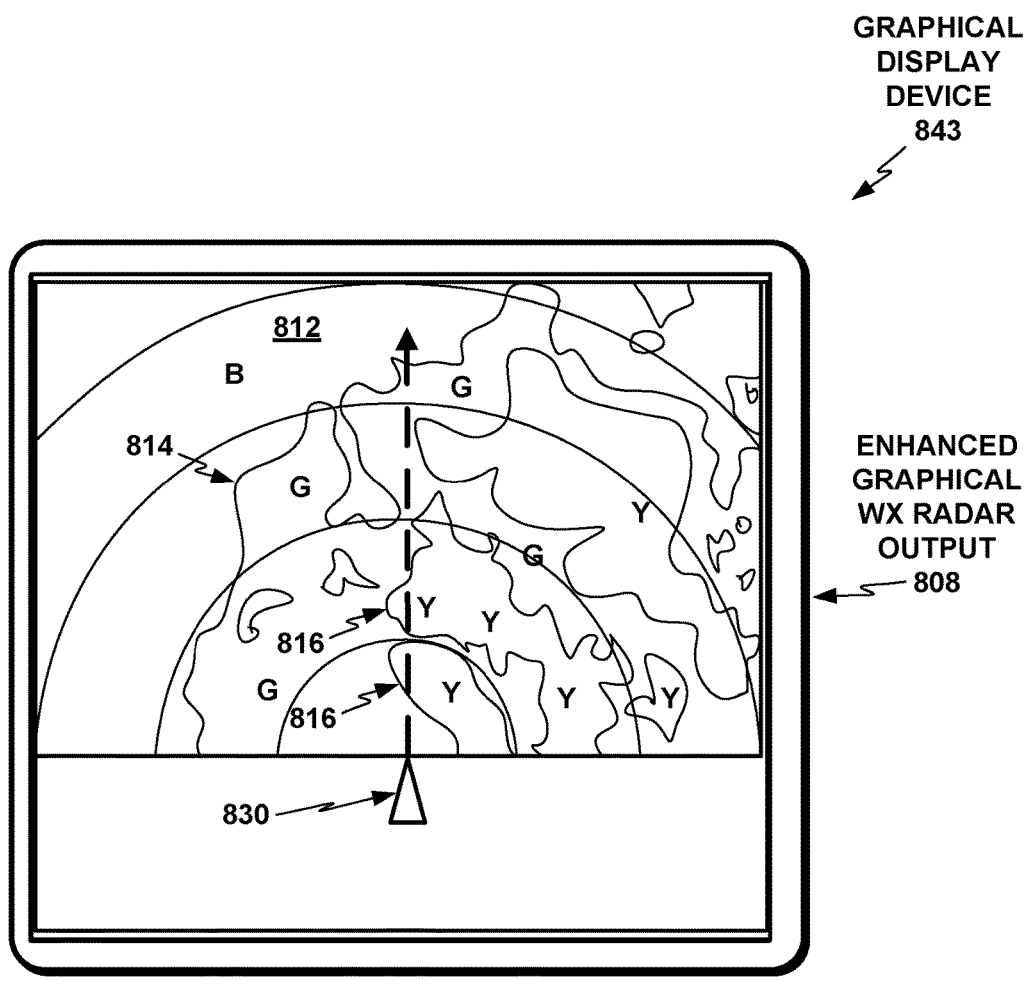
FIG. 8 shows a weather radar graphical display device displaying a two-dimensional weather map generated by an enhanced weather radar mapping unit as shown in FIG. 1, in accordance with example aspects of this disclosure.

FIG. 8 shows a graphical display device 843, e.g., a tablet computer onboard aircraft 20 and executing an EFB application, displaying a two-dimensional weather map 808 generated by an enhanced weather radar mapping unit 106 as shown in FIG. 1, in accordance with example aspects of this disclosure. Graphical display device 843 onboard aircraft 20 may receive two-dimensional weather map 808 from enhanced weather radar processing system 104 onboard aircraft 10 as shown in FIG. 1. Two-dimensional weather map 808 shows an aircraft icon 830 representing the ownship aircraft (e.g., aircraft 20 as shown in FIG. 6), and a map of the weather in front of the ownship aircraft, showing some areas 812 in black, other areas 814 in green, and other areas 816 in yellow. two-dimensional weather map 808 may represent a graphical rendering of the weather structure 230 of FIG. 2, rendered by enhanced weather radar mapping unit 106, such that the green areas 814 are areas of sky that enhanced weather radar mapping unit 106 has detected as being stratiform areas affected by bright band, whereas yellow areas 816 are areas that genuinely have moderately convective weather, but no high convection or risk of lightning or hail.

Two-dimensional weather map 808 with enhanced modifications based on supplemental data may thus be likely to help a pilot or flight crew of an aircraft 200 to understand the actual nature of the weather structure as being free of the high precipitation rate typically correlated with convective cells and its associated hazards such as lightning and turbulence. As such, two-dimensional weather map 808 as enabled by enhanced weather radar mapping unit 106, and as enhanced weather radar mapping unit 106 causes enhanced weather radar processing system 104 to generate, may enable the pilot or flight crew of aircraft 20 to maintain heading, keeping the flight on schedule and making efficient use of its fuel, rather than re-route the flight to avoid bright band affected areas that a traditional weather radar display might render the same as areas of high precipitation and high convection.

Although the threshold corresponding to the highest reflectivity range (and, e.g., graphically depicted in red) may normally be 40 dBZ, the threshold may be modified in other examples, such as in the case of manual gain. In some examples, weather radar processing system 104 and/or enhanced weather radar mapping unit 106 may automatically account for or recalibrate for changes in scale or signal sensitivity such as in the case of manual gain. For example, in case of manual gain, weather radar processing system 104 may apply a scale translation uniformly to all the reflectivity ranges, to ensure that the same graphical indications are applied uniformly to the same real reflectivity ranges as manual gain is adjusted, and such that enhanced weather radar mapping unit 106 still modifies bright band signals to cause weather radar processing system 104 to generate outputs that indicate or depict bright band weather structure portions distinctively instead of in a high reflectivity range.

In some examples, aircraft 200 may be an unpiloted aircraft (e.g., an uncrewed aerial vehicle (UAV)) or an aircraft on autopilot or otherwise being flown entirely or in part by software, and the automatic flight software may be enabled to make tactical navigation decisions. In these examples, enhanced weather radar mapping unit 106 may cause weather radar processing system 104 to generate weather radar outputs to the automatic flight software directly as data to feed to a navigation decision module, instead of as data for a weather radar graphical display device to render in a graphical display. In these examples, enhanced weather radar mapping unit 106 may analogously cause weather radar processing system 104 to generate weather radar outputs in which bright band portions of weather structures are indicated as being within an intermediate reflectivity range instead of being in the highest reflectivity range as would be indicated from the initial data without applying bright band suppression. Enhanced weather radar mapping unit 106 may thus enable an automatic software-based navigation and/or piloting system to make decisions based on an accurate characterization of bright band affected weather structures despite the anomalously high reflectivity induced by the bright band effect.

In some examples, enhanced weather radar mapping unit 106 may apply a variety of other techniques and criteria besides determining VIR and comparing VIR with a threshold VIR to determine whether a radar signal from a weather structure is affected by bright band. In some examples, enhanced weather radar mapping unit 106 may apply vertical span as a criterion. In these examples, for enhanced weather radar mapping unit 106 to determine whether the combination of the determined reflectivity ranges of the portions of the vertical column meet the criteria indicative of bright band includes enhanced weather radar mapping unit 106 determining whether a vertical span of the portions of the vertical column that are in the highest reflectivity range is less than a threshold vertical span. For example, enhanced weather radar mapping unit 106 may determine the vertical span or vertical distance between the center or top of the topmost portion in the vertical column having the highest reflectivity and the center or bottom of the lowest portion in the vertical column having that has the highest reflectivity.

If enhanced weather radar mapping unit 106 determines that the vertical span is low or covers a short vertical distance such that it is below a threshold vertical span, enhanced weather radar mapping unit 106 determines that the determined reflectivity ranges of the portions of the vertical column meet the criterion indicative of bright band, while if the vertical span is higher than the threshold vertical span, enhanced weather radar mapping unit 106 determines that the vertical column does not meet the criterion indicative of bright band. The threshold vertical span may be 2,000 feet or 3,000 feet, or another value between 1,000 feet and 5,000 feet, or other value that may be determined by testing in comparison with independent means of characterizing weather structures, in various examples.

In other examples, enhanced weather radar mapping unit 106 may apply vertical difference in reflectivity range, or dBZ range, as the criterion or one of the criteria for determining whether a vertical column is affected by bright band. In such examples, enhanced weather radar mapping unit 106 may determine whether a vertical difference in reflectivity range between at least one of the portions of the vertical column that are in the highest reflectivity range and at least of the portions of the vertical column that are in one of the lower reflectivity ranges is greater than a threshold difference. In other words, enhanced weather radar mapping unit 106 may determine if there is a substantial jump in reflectivity within a relatively short vertical range. In one example, enhanced weather radar mapping unit 106 may evaluate whether any portion of the vertical column in the highest reflectivity range (e.g., >40 dBZ) has a portion within an interval of, e.g., three, two, or one portions below it that has substantially lower reflectivity, e.g., at least 10 dBZ below the lower bound of the highest reflectivity range (e.g., the 20-30 dBZ range (green) or lower). In some other examples, enhanced weather radar mapping unit 106 may apply a vertical difference in reflectivity range of any value between 10 and 40 dBZ for this criterion.

In other examples, enhanced weather radar mapping unit 106 may combine analysis of two or more criteria such as those described above, and/or including double-checking or error analysis in radar signal and/or processing as described above. For example, enhanced weather radar mapping unit 106 may apply two or all three of VIR, vertical span, and vertical difference in dBZ range as described above, and may apply any of various options in decision logic in combining the results.

Figure 9:
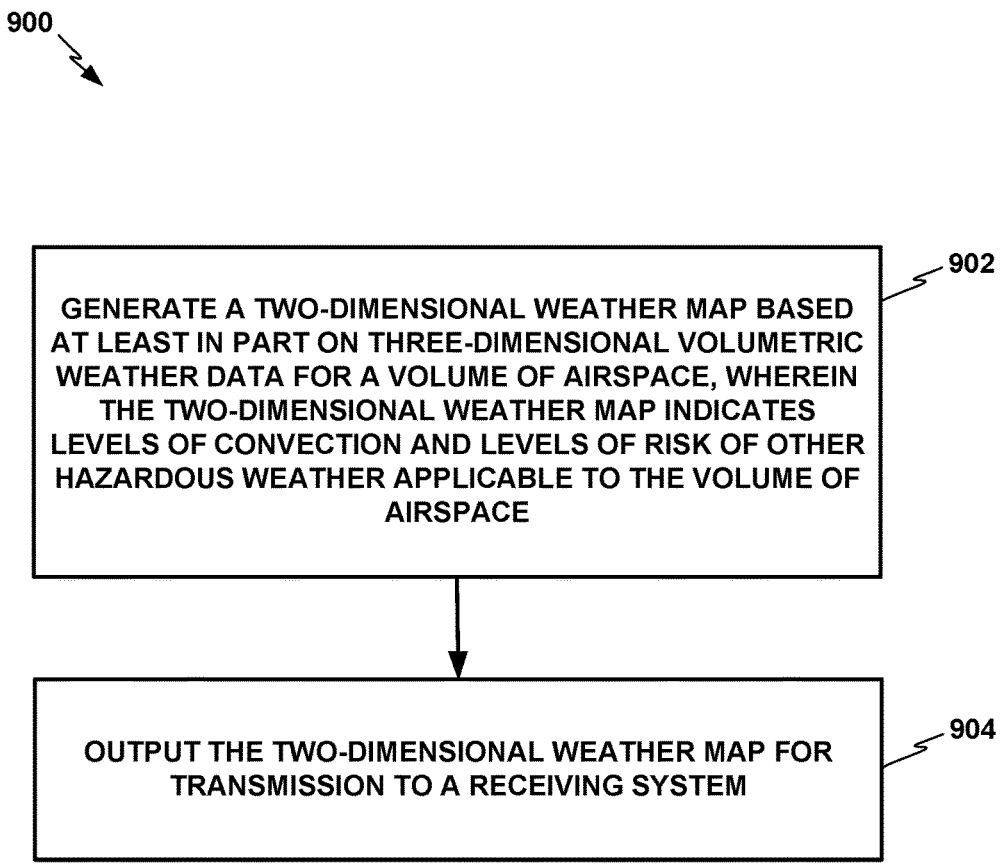
FIG. 9 shows a flowchart for an example method that an enhanced weather radar mapping unit may perform for generating a two-dimensional weather map that incorporates evaluation of supplemental criteria based on supplemental data in addition to weather radar reflectivity data, in accordance with example aspects of this disclosure.

FIG. 9 shows a flowchart for an example method 900 that enhanced weather radar mapping unit 106 may perform for generating a two-dimensional weather map that incorporates evaluation of supplemental criteria based on supplemental data in addition to weather radar reflectivity data, in accordance with example aspects of this disclosure. Method 900 includes generating, by a computing system (e.g., enhanced weather radar processing system 104) comprising one or more processors (e.g., one or more processors 122), a two-dimensional weather map based at least in part on three-dimensional volumetric weather data for a volume of airspace, wherein the two-dimensional weather map indicates levels of convection and levels of risk of other hazardous weather applicable to the volume of airspace (e.g., enhanced weather radar processing system 104 generating a two-dimensional weather map based at least in part on three-dimensional volumetric weather data that enhanced weather radar processing system 104 has generated for a volume of airspace in front of the aircraft, and indicating levels of convection based on radar reflectivity and corrected for secondary effects such as bright band using a combination of vertically integrated radar reflectivity and temperature data, and levels of risk of lightning and hail applicable to the volume of airspace) (902). Method 900 further includes outputting, by the computing system, the two-dimensional weather map for transmission to a receiving system (e.g., an enhanced weather radar processing system 104 onboard aircraft 10 outputting the two-dimensional weather map for transmission, via data aggregating system 150, to a tablet computer onboard aircraft 20 and executing an EFB application such as graphical display device 843 as in FIG. 8) (904).

In some examples, the weather radar data may include, for example, radar reflectivity data in an earth-referenced three-dimensional (or "volumetric") memory buffer (e.g., in one or more memory devices 124 in weather radar processing system 104). The memory buffer may include the radar imaging data combined with sources of three-dimensional geographic and atmospheric data and sources of three-dimensional aircraft data on the aircraft's position, altitude, heading, and speed, for example. One or more processors onboard the aircraft may combine the three-dimensional radar imaging data, the geographic and atmospheric data, and the aircraft data to store in the memory buffer, and/or in other data storage (e.g., data storage 126). A weather radar system, e.g., onboard an aircraft, may be configured to scan the entire three-dimensional space in front of the aircraft, and the one or more processors may store the reflectivity data in the three-dimensional memory buffer. The one or more processors onboard the aircraft may update the memory buffer with newly obtained radar reflectivity data. The one or more processors may extract reflectivity data from the memory buffer to generate the desired weather information, and for enhanced weather radar mapping unit 106 to apply supplemental weather criteria incorporating supplemental data such as temperature data, without having to make and wait for view-specific antenna scans. In addition, with the three-dimensional volumetric buffer data, the presentation of weather information is not constrained to a single tilt-plane such as is inherent to conventional radar.

In some examples, weather radar processing system 104 may generate the weather radar output configured for a high-resolution display enabled for display of a three-dimensional (3D) view of the weather structure and the reflectivity range of each of its portions, with or without enhanced weather mapping based on supplemental criteria. This high-resolution display of the weather structure may be enabled for a high resolution in time, such as a high frame rate (e.g., above a selected frame rate). In addition, or instead, this high-resolution display of the weather structure and the reflectivity range of each of its portions, with or without enhanced weather mapping based on supplemental criteria, may also be enabled for a high range (e.g., above a selected distance threshold). The high-resolution display of the weather structure and the reflectivity range of each of its portions as potentially modified by enhanced weather radar mapping unit 106 may serve as a valuable resource in assisting the crew of the aircraft 200 in understanding the weather structure, and whether or how they should alter their flight strategy or flight plan to avoid the weather structure.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. While weather radar system 102 and enhanced weather radar processing system 104 with enhanced weather radar mapping unit 106 are separate systems in the example depicted in FIG. 1, in other examples, features or aspects of enhanced weather radar processing system 104 with enhanced weather radar mapping unit 106 may be implemented as parts of a weather radar system as a single integrated unit. In some such examples, enhanced weather radar mapping unit 106 may be implemented as a feature or function of onboard weather radar system 102, or onboard weather radar system 102 and enhanced weather radar processing system 104 with enhanced weather radar mapping unit 106 may be implemented together as a single system, subsystem, device, or component.

Elements of enhanced weather radar processing system 104 and/or enhanced weather radar mapping unit 106, and/or system elements for executing and/or storing enhanced weather radar mapping unit 106 or features thereof (e.g., one or more processors 122) as disclosed above, may be implemented in any of a variety of types of solid state circuit elements, such as central processing units (CPUs), digital signal processors (DSPs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 124 may include any volatile or non-volatile media, such as a RAM, ROM, non-volatile RAM (NVRAM), electrically erasable programmable ROM (EEPROM), flash memory, and the like. One or more memory devices 124 may store computer readable instructions that, when executed by one or more processors 122, cause the one or more processors 122 to implement the techniques attributed to enhanced weather radar mapping unit 106 herein.

Elements of enhanced weather radar mapping unit 106 may be programmed with various forms of software. Enhanced weather radar mapping unit 106 may be implemented at least in part as, or include, one or more executable applications, application modules, libraries, classes, methods, objects, routines, subroutines, firmware, and/or embedded code, for example. Elements of enhanced weather radar mapping unit 106 as in any of the examples herein may be implemented as a device, a system, an apparatus, and may embody or implement a method of enhanced weather radar mapping, including for implementing example method 700 as described with reference to FIG. 9.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Aircraft system 100 may be implemented on any type of aircraft. Analogous enhanced weather radar systems with enhanced weather radar mapping of this disclosure may also be implemented in other contexts such as a ground-based weather station or a marine weather radar system for equipping a marine vessel. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying craft. An "aircraft" as described and claimed herein may include any crewed or uncrewed craft (e.g., uncrewed aerial vehicle (UAV), flying robot, or automated cargo or parcel delivery craft). While the example of FIG. 1 shows enhanced weather radar processing system 104 communicating processed weather radar outputs to weather radar graphical display device 708 for graphical display for a pilot or flight crew, in other examples, enhanced weather radar processing system 104 may communicate processed weather radar outputs to another system, component, device, software module, computer, or other feature. For example, in an automated navigation system or in an uncrewed aircraft that does not include a graphical radar display, enhanced weather radar processing system 104 may communicate processed weather radar outputs to a software module, computer, embedded circuit, or other feature that performs automated navigation.

Various illustrative aspects of the disclosure are described above. These and other aspects are within the scope of the following claims.

What is claimed is:
1. A device comprising:
one or more memory devices; and
one or more processors operably coupled to the one or more memory devices and configured to:
generate a two-dimensional weather map based at least in part on three-dimensional volumetric weather data for a volume of airspace, wherein the two-dimensional weather map indicates levels of convection and levels of risk of other hazardous weather applicable to the volume of airspace, wherein the two-dimensional weather map represents weather conditions of vertical columns in the volume of airspace as a position on the two-dimensional weather map; and
output the two-dimensional weather map for transmission to a receiving system.

2. The device of claim 1, wherein the one or more processors are further configured such that the two-dimensional weather map indicates the levels of convection based at least in part on radar reflectivity data and based at least in part on corrections to the levels of convection based at least in part on both the radar reflectivity data and temperature data.

3. The device of claim 1, wherein the one or more processors are further configured such that the levels of risk of other hazardous weather indicated in the three-dimensional volumetric weather data comprise indicated levels of risk of hail and indicated levels of risk of lightning.

4. The device of claim 1, wherein the one or more processors are further configured such that generating the two-dimensional weather map comprises, for each respective position of a plurality of positions on the two-dimensional weather map, graphically indicating the respective position as either:
   missing data;
   being below a threshold indicative of convection;
   being above the threshold indicative of convection but having no indication of lightning or hail;
   being above the threshold indicative of convection and having an indicated risk of lightning but no indication of hail; or
   having an indicated risk of hail.

5. The device of claim 4, wherein the one or more processors are further configured such that generating the two-dimensional weather map comprises:
   for positions on the two-dimensional weather map that are above the threshold indicative of convection but with no indication of lightning or hail, graphically indicating the positions with different colors indicative of different ranges of indicated convection;
   for a position on the two-dimensional weather map that is above the threshold indicative of convection and has an indicated risk of lightning but no indication of hail, graphically indicating the position with a lightning icon; and
   for a position on the two-dimensional weather map that has an indicated risk of hail, graphically indicating the position with a hail icon.

6. The device of claim 1,
   wherein the device comprises a mobile computing device having an Electronic Flight Bag (EFB) application installed or executing thereon, and
   wherein the one or more processors are further configured to receive the three-dimensional volumetric weather data and indications of levels of convection and levels of risk of other hazardous weather in the volume of airspace from a weather radar system, prior to generating the two-dimensional weather map based at least in part on the three-dimensional volumetric weather data.

7. The device of claim 1,
   wherein the device comprises a weather processing radar system comprised in a system that also comprises a weather radar system,
   wherein the one or more processors are further configured to:
      determine the levels of convection and the levels of risk of other hazardous weather in the volume of airspace based at least in part on a plurality of radar return signals received by the weather radar system; and
      generate the three-dimensional volumetric weather data and indications of the levels of convection and the levels of risk of other hazardous weather, prior to generating the two-dimensional weather map based at least in part on the three-dimensional volumetric weather data.

8. The device of claim 1,
   wherein the device is disposed or installed on a vehicle, and
   wherein the device receives the three-dimensional volumetric weather data and indicated levels of convection and levels of risk of other hazardous weather in the volume of airspace from an aircraft weather radar system installed on the vehicle.

9. The device of claim 1, wherein the one or more processors are further configured to output the two-dimensional weather map for transmission to the receiving system comprises outputting the two-dimensional weather map for transmission to a weather data aggregating system or to a vehicle remote from the device.

10. The device of claim 1,
    wherein the one or more processors are further configured to determine a positive or negative updated data status for positions on the two-dimensional weather map that indicates whether or not, respectively, each of the positions do not have updated data from a most recent weather radar scan of the weather radar signal,
    wherein the one or more processors being configured to output the two-dimensional weather map further comprises the one or more processors being configured to override other criteria and generate a graphical indication of positions that comprise non-updated data.

11. The device of claim 1, further comprising determining a positive or negative intervening weather data attenuation status for positions on the two-dimensional weather map that indicates whether or not, respectively, each of the positions comprises weather radar data that is attenuated by intervening weather,
    wherein generating the weather map output further comprises overriding other criteria and generating a graphical indication of positions that comprise data attenuated by intervening weather.

12. A system comprising:
    a weather radar system;
    one or more memory devices; and
    one or more processors operably coupled to the one or more memory devices and configured to:
       generate a two-dimensional weather map based at least in part on three-dimensional volumetric weather data for a volume of airspace based at least in part on weather data collected with the weather radar system, wherein the two-dimensional weather map indicates levels of convection and levels of risk of other hazardous weather applicable to the volume of airspace, wherein the two-dimensional weather map represents weather conditions of a vertical columns in the volume of airspace as a position on the two-dimensional weather map; and
       output the two-dimensional weather map for transmission to a receiving system.

13. The system of claim 12, wherein the one or more processors are further configured such that generating the two-dimensional weather map comprises, for each respective position of a plurality of positions on the two-dimensional weather map, graphically indicating the respective position as either:
    missing data;
    being below a threshold indicative of convection;

being above the threshold indicative of convection but having no indication of lightning or hail;

being above the threshold indicative of convection and having an indicated risk of lightning but no indication of hail; or having an indicated risk of hail.

14. The system of claim 12, wherein the one or more processors are further configured to:

output the two-dimensional weather map for transmission to a weather data aggregating system;

receive additional weather data from the weather data aggregating system; and generate the two-dimensional weather map based in part on the additional weather data from the weather data aggregating system.

15. A method comprising:

generating, by a computing system comprising one or more processors, a two-dimensional weather map based at least in part on three-dimensional volumetric weather data for a volume of airspace, wherein the two-dimensional weather map indicates levels of convection and levels of risk of other hazardous weather applicable to the volume of airspace, wherein the two-dimensional weather map represents weather conditions of vertical columns in the volume of airspace as a position on the two-dimensional weather map; and outputting, by the computing system, the two-dimensional weather map for transmission to a receiving system.

16. The method of claim 15, wherein generating the two-dimensional weather map comprises, for each respective position of a plurality of positions on the two-dimensional weather map, graphically indicating the respective position as either:

missing data;

being below a threshold indicative of convection;

being above the threshold indicative of convection but having no indication of lightning or hail;

being above the threshold indicative of convection and having an indicated risk of lightning but no indication of hail; or having an indicated risk of hail.

17. The method of claim 15, further comprising:

outputting the two-dimensional weather map for transmission to a weather data aggregating system;

receiving additional weather data from the weather data aggregating system; and generating the two-dimensional weather map based in part on the additional weather data from the weather data aggregating system.

18. The device of claim 1, wherein the one or more processors are further configured to:

sum reflectivity values for each portion of a first vertical column;

determine whether the sum of the reflectivity values for the first vertical column is below a threshold; and determine a level of convection for the first vertical column based on whether the sum of the reflectivity values for the first vertical column is below the threshold.

19. The device of claim 1, wherein the one or more processors are further configured to:

determine that a maximum reflectivity value in a first vertical column exceeds a threshold; and determine a level of convection for the first vertical column in response to determining that the maximum reflectivity value in the first vertical column exceeds the threshold.

20. The device of claim 1, wherein the one or more processors are further configured to:

determine whether a vertical span of portions of a first vertical column that are in a highest reflectivity range is less than a threshold vertical span;

determine a level of convection for the first vertical column based on whether the vertical span of portions of the first vertical column that are in the highest reflectivity range is less than the threshold vertical span.

* * * * *